(12) United States Patent
Wyrwas et al.

(10) Patent No.: US 9,454,265 B2
(45) Date of Patent: Sep. 27, 2016

(54) INTEGRATION OF A LIGHT COLLECTION LIGHT-GUIDE WITH A FIELD SEQUENTIAL COLOR DISPLAY

(71) Applicant: QUALCOMM Incorporated, San Diego, CA (US)

(72) Inventors: John Michael Wyrwas, Berkeley, CA (US); Paul Eric Jacobs, La Jolla, CA (US); Evgeni Petrovich Gousev, Saratoga, CA (US); Russell Wayne Gruhlke, Milpitas, CA (US); Chung-Po Huang, San Jose, CA (US); Hae-Jong Seo, San Jose, CA (US); Xiquan Cui, San Jose, CA (US); Jacek Maitan, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/034,374

(22) Filed: Sep. 23, 2013

(65) Prior Publication Data

US 2015/0084927 A1 Mar. 26, 2015

(51) Int. Cl.
*G06F 3/042* (2006.01)
*G09G 3/34* (2006.01)
(Continued)

(52) U.S. Cl.
CPC ........... *G06F 3/0428* (2013.01); *G06F 3/0412* (2013.01); *G06F 3/0421* (2013.01);
(Continued)

(58) Field of Classification Search
CPC ............... G06F 3/0421; G06F 3/0428; G06F 3/04883; G09G 3/3433
USPC ................................................ 345/173, 175
See application file for complete search history.

(56) References Cited

U.S. PATENT DOCUMENTS 7,751,663 B2   7/2010 Van Ostrand
8,125,580 B2 *  2/2012 Takama ............. G02F 1/13338
                                                    345/104

(Continued)

FOREIGN PATENT DOCUMENTS

EP     1986442 A1    10/2008
EP     2354902 A2     8/2011
(Continued)

OTHER PUBLICATIONS

U.S. Office Action dated Feb. 12, 2015, issued in U.S. Appl. No. 14/034,376.
(Continued)

*Primary Examiner* — Temesghen Ghebretinsae
*Assistant Examiner* — Benyam Ketema
(74) *Attorney, Agent, or Firm* — Weaver Austin Villeneuve & Sampson LLP

(57) ABSTRACT

This disclosure provides systems, methods and apparatus for touch and gesture recognition, using a field sequential color display. The display includes a processor, a lighting system, and an arrangement for spatial light modulation that includes an array of light modulators. Each light modulator is switchable between an open position that permits transmittance of light from the lighting system through a respective aperture and a shut position that blocks light transmission through the respective aperture. The processor switches the light modulators in accordance with a first modulation scheme to render an image and in accordance with a second modulation scheme to selectively pass object illuminating light through at least one of the respective apertures. A light sensor receives light resulting from interaction of the object illuminating with an object and outputs a signal to the processor. The processor recognizes, from the output of the light sensor, a characteristic of the object.

20 Claims, 20 Drawing Sheets

(51) Int. Cl.
*G06F 3/041* (2006.01)
*G06F 3/0488* (2013.01)

(52) U.S. Cl.
CPC ........... *G06F3/04883* (2013.01); *G09G 3/346* (2013.01); *G09G 3/3433* (2013.01); *G06F 2203/04109* (2013.01); *G06F 2203/04808* (2013.01); *G09G 2360/141* (2013.01)

(56) References Cited

U.S. PATENT DOCUMENTS

| | | | |
|---|---|---|---|
| 8,350,827 B2* | 1/2013 | Chung | G02F 1/1368 345/102 |
| 8,416,227 B2 | 4/2013 | Fujioka et al. | |
| 8,467,133 B2 | 6/2013 | Miller | |
| 8,514,190 B2* | 8/2013 | Birkler | G06F 1/3203 178/18.07 |
| 8,907,923 B2* | 12/2014 | Cho et al. | 345/175 |
| 2002/0000967 A1* | 1/2002 | Huston | G09G 3/002 345/88 |
| 2003/0111588 A1 | 6/2003 | Chen | |
| 2006/0001914 A1 | 1/2006 | Mesmer et al. | |
| 2006/0187528 A1* | 8/2006 | Hagood | G02B 6/0043 359/298 |
| 2006/0209012 A1* | 9/2006 | Hagood, IV | 345/109 |
| 2006/0289760 A1 | 12/2006 | Bathiche | |
| 2007/0205969 A1 | 9/2007 | Hagood et al. | |
| 2008/0037104 A1* | 2/2008 | Hagood | G02B 26/0841 359/292 |
| 2008/0055494 A1 | 3/2008 | Cernasov | |
| 2008/0055495 A1* | 3/2008 | Cernasov | 349/12 |
| 2008/0074401 A1* | 3/2008 | Chung | G02F 1/1368 345/175 |
| 2008/0121442 A1 | 5/2008 | Boer et al. | |
| 2008/0122803 A1* | 5/2008 | Izadi et al. | 345/175 |
| 2009/0122030 A1 | 5/2009 | Morimoto et al. | |
| 2009/0143109 A1 | 6/2009 | Yamazaki | |
| 2009/0146992 A1 | 6/2009 | Fukunaga et al. | |
| 2010/0007632 A1 | 1/2010 | Yamazaki | |
| 2010/0085330 A1 | 4/2010 | Newton | |
| 2010/0182282 A1 | 7/2010 | Kurokawa et al. | |
| 2010/0188443 A1* | 7/2010 | Lewis | G02B 26/02 345/691 |
| 2010/0321339 A1* | 12/2010 | Kimmel | G06F 3/0412 345/175 |
| 2011/0002577 A1 | 1/2011 | Van Ostrand | |
| 2011/0037732 A1 | 2/2011 | Takama et al. | |
| 2011/0115747 A1* | 5/2011 | Powell et al. | 345/175 |
| 2011/0150501 A1 | 6/2011 | Guttag et al. | |
| 2011/0157097 A1 | 6/2011 | Hamada et al. | |
| 2011/0227487 A1 | 9/2011 | Nichol et al. | |
| 2011/0227873 A1 | 9/2011 | Chung et al. | |
| 2012/0001878 A1 | 1/2012 | Kurokawa et al. | |
| 2012/0032919 A1 | 2/2012 | Travis et al. | |
| 2012/0076353 A1 | 3/2012 | Large | |
| 2012/0105341 A1 | 5/2012 | Park et al. | |
| 2012/0127128 A1* | 5/2012 | Large et al. | 345/175 |
| 2012/0127140 A1 | 5/2012 | Ryan et al. | |
| 2012/0163021 A1 | 6/2012 | Bohn et al. | |
| 2012/0182277 A1 | 7/2012 | Jeong et al. | |
| 2012/0229418 A1* | 9/2012 | Schwartz et al. | 345/174 |
| 2012/0320308 A1 | 12/2012 | Yeo et al. | |
| 2013/0027444 A1 | 1/2013 | Chui et al. | |
| 2013/0037815 A1 | 2/2013 | Okajima et al. | |
| 2013/0082607 A1 | 4/2013 | Gandhi et al. | |
| 2013/0082980 A1 | 4/2013 | Gruhlke et al. | |
| 2013/0100075 A1 | 4/2013 | Viswanathan et al. | |
| 2013/0135188 A1 | 5/2013 | Yin et al. | |
| 2013/0135259 A1 | 5/2013 | King et al. | |
| 2013/0181896 A1 | 7/2013 | Gruhlke et al. | |
| 2015/0029699 A1 | 1/2015 | Yamazaki et al. | |
| 2015/0083917 A1 | 3/2015 | Wyrwas et al. | |
| 2015/0084928 A1 | 3/2015 | Wyrwas et al. | |
| 2015/0084994 A1 | 3/2015 | Wyrwas et al. | |

FOREIGN PATENT DOCUMENTS

| | | |
|---|---|---|
| EP | 2402933 A2 | 1/2012 |
| EP | 2560207 A1 | 2/2013 |
| GB | 2489657 A | 10/2012 |
| WO | WO-2007075832 | 7/2007 |
| WO | WO-2015041893 A1 | 3/2015 |
| WO | WO-2015041894 A1 | 3/2015 |
| WO | WO-2015041898 A1 | 3/2015 |
| WO | WO-2015041901 A1 | 3/2015 |

OTHER PUBLICATIONS

International Search Report and Written Opinion—PCT/US2014/054704—ISA/EPO—Nov. 24, 2014.
International Search Report and Written Opinion—PCT/US2014/054706—ISA/EPO—Jan. 28, 2015.
International Search Report and Written Opinion—PCT/US2014/054782—ISA/EPO—Jan. 14, 2015.
International Search Report and Written Opinion—PCT/US2014/054831—ISA/EPO—Nov. 20, 2014.
U.S. Office Action dated Sep. 23, 2015, issued in U.S. Appl. No. 14/034,360.
U.S. Office Action dated Jun. 29, 2015, issued in U.S. Appl. No. 14/034,376.
U.S. Final Office Action dated Aug. 6, 2015, issued in U.S. Appl. No. 14/034,376.
U.S. Final Office Action dated Nov. 16, 2015, issued in U.S. Appl. No. 14/034,369.

* cited by examiner

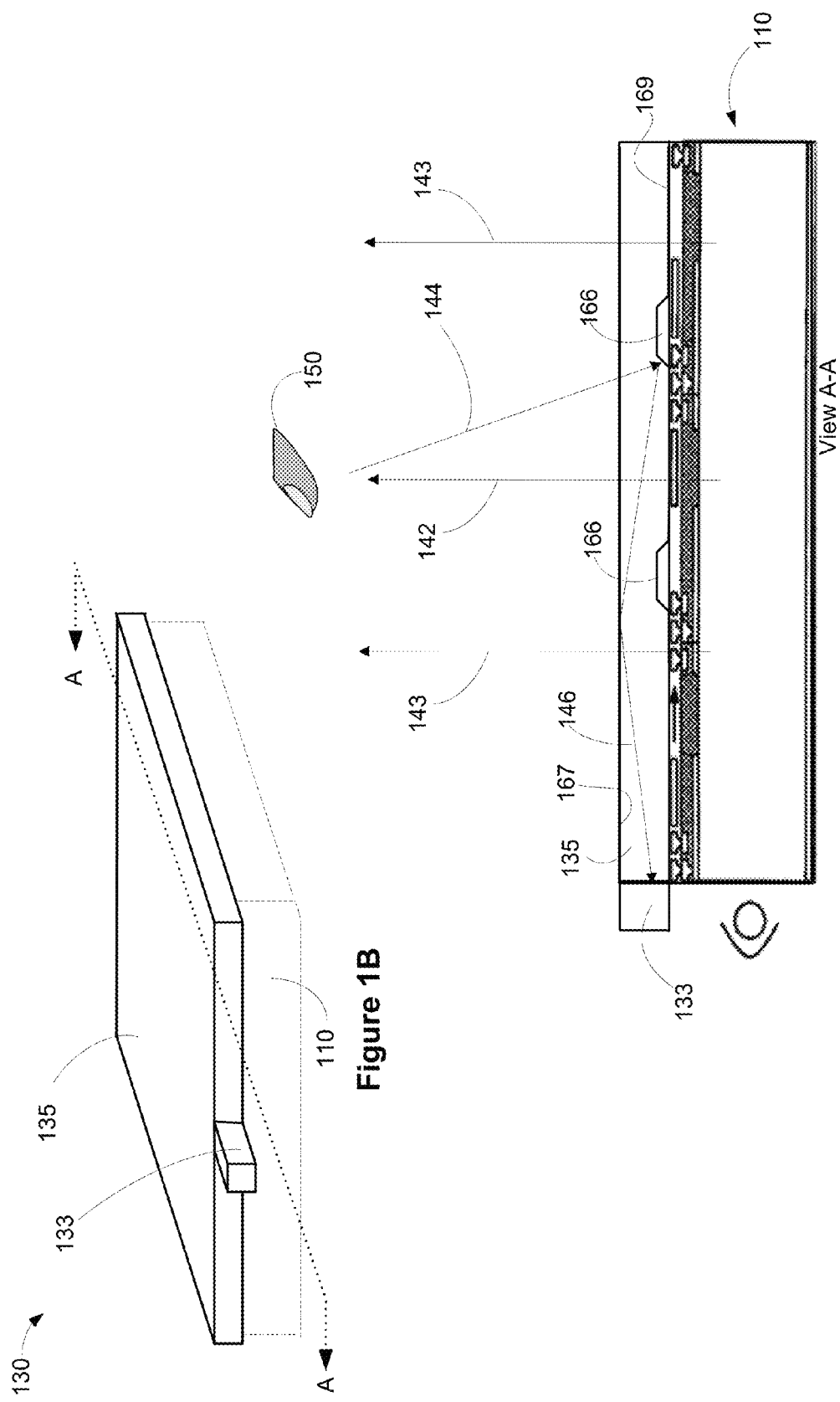

Detail A

INTEGRATION OF A LIGHT COLLECTION LIGHT-GUIDE WITH A FIELD SEQUENTIAL COLOR DISPLAY

TECHNICAL FIELD

This disclosure relates to techniques for touch and gesture recognition, and, more specifically, to a field sequential color (FSC) display that provides a user input/output interface, controlled responsively to a user's touch and/or gesture.

DESCRIPTION OF THE RELATED TECHNOLOGY

Electronic devices such as smart phones, tablets, laptops, personal computers, and the like increasingly feature a touchscreen user interface. The power, cost and durability requirements typical of handheld devices are not well-achieved by known techniques. For example, projected capacitance touch (PCT), presently the most commonly used technology for handheld devices, generally employs transparent layers of indium tin oxide (ITO) or other transparent conductor materials stacked together above the display. This reduces the clarity of the display, adds significant cost, and additional controller electronics are needed to read out the finger locations. In addition, there can be cross talk and noise between the display electronics and the touch electronics, reducing the performance of both.

A multi-touch-technology wherein a planar light guide with a light turning arrangement is disposed substantially between a display backlight system and a front surface is one solution to add touch functionality to a field sequential color (FSC). However, this solution may require adding an additional light-guide layer, which may increase cost and thickness.

Thus, improved techniques for providing a touch screen interface are desirable.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an interactive display having a front surface including a viewing area, the interactive display including a display lighting system and an arrangement for spatial light modulation, the arrangement for spatial light modulation including an array of light modulators, each light modulator configured to be switched between an open position that permits transmittance of light from the display lighting system through a respective aperture to the front surface and a shut position that blocks light transmission through the respective aperture. The apparatus also includes a transparent substrate, disposed between the display lighting system and the front surface and substantially parallel to the front surface, and having a periphery at least coextensive with the viewing area; at least one light sensor disposed outside the periphery of the transparent substrate; and a processor. The light modulators are micro electromechanical (MEM) devices disposed proximate to a rear surface of the transparent substrate. The light modulators are switched in accordance with a first modulation scheme to render an image. The transparent substrate is configured to pass light emitted by the display lighting system toward the front surface and to receive light reflected through the front surface from an object, the transparent substrate including a first light-turning arrangement that redirects a portion of the received light toward the at least one light sensor. The light sensor is configured to output, to the processor, a signal representative of a characteristic of the received, redirected light. The processor is configured to switch the light modulators in accordance with a second modulation scheme to selectively pass object illuminating light through at least one of the respective apertures, the object illuminating light being at least partially unrelated to the image. The processor is also configured to recognize, from the output of the light sensor, a characteristic of the object.

In some implementations, the object may include one or more of a hand, finger, hand held object, and other object under control of a user.

In some implementations, the display lighting system may include at least one infrared (IR) light emitter. The at least one light sensor may include an IR light sensor. The transparent substrate may be configured to pass IR light emitted by the display lighting system toward the front surface and to receive IR light scattered through the display front surface from the object. The first light-turning arrangement may redirect a portion of the received IR light toward the IR light sensor.

Another innovative aspect of the subject matter described in this disclosure can be implemented in a method that includes switching, with a processor, one or more light modulators of an array of light modulators. An interactive display has a front surface including a viewing area, the interactive display including a display lighting system and an arrangement for spatial light modulation, the arrangement for spatial light modulation including an array of light modulators, each light modulator configured to be switched between an open position that permits transmittance of light from the display lighting system through a respective aperture to the front surface and a shut position that blocks light transmission through the respective aperture. A transparent substrate is disposed between the display lighting system and the front surface and substantially parallel to the front surface, and having a periphery at least coextensive with the viewing area. At least one light sensor is disposed outside the periphery of the transparent substrate. The light modulators are micro electromechanical (MEM) devices disposed proximate to a rear surface of the transparent substrate. The light modulators are switched in accordance with a first modulation scheme to render an image, and in accordance with a second modulation scheme to selectively pass object illuminating light through at least one of the respective apertures, the object illuminating light being at least partially unrelated to the image. The transparent substrate is configured to pass light emitted by the display lighting system toward the front surface and to receive light reflected through the front surface from an object, the transparent substrate including a first light-turning arrangement that redirects a portion of the received light toward the at least one light sensor. The method further includes outputting, from the light sensor to the processor, a signal representative of a characteristic of the received, redirected light, and recognizing, from the output of the light sensor, a characteristic of the object.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 1B and FIG. 1C show an example of an arrangement including a planar light guide and a light sensor.

Like reference numbers and designations in the various drawings indicate like elements.

DETAILED DESCRIPTION

Figure 1A:
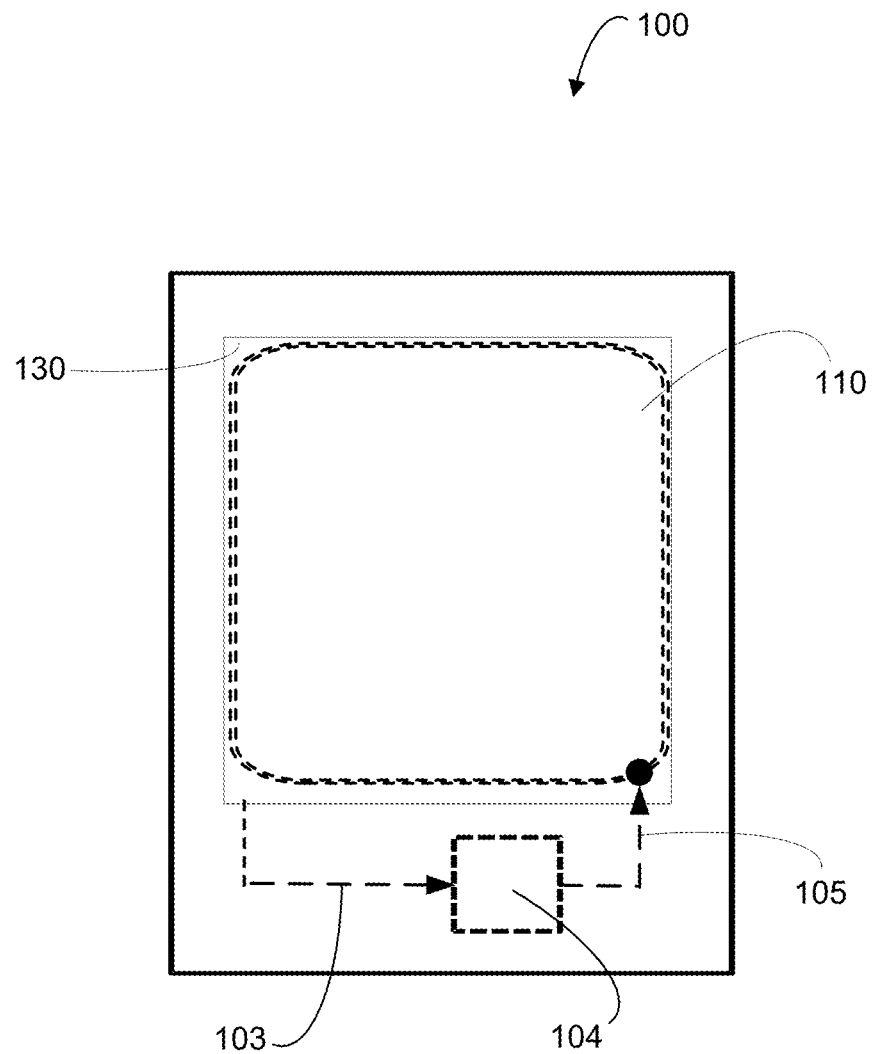
FIG. 1A shows a block diagram of an example of an electronic device having an electronic display.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Described herein below are new techniques for an interactive display with improved user input/output functionality. In some implementations, a gesture-responsive user input/output (I/O) interface for an electronic device is provided. "Gesture" as used herein broadly refers to a gross motion of a user's hand, digit, or hand-held object, or other object under control of the user. The motion may be made proximate to, but not necessarily in direct physical contact with, the electronic device. In some implementations, the electronic device senses and reacts in a deterministic way to a user's gesture. In some implementations, a document scanning capability is provided.

Particular implementations of the subject matter described in this disclosure can be implemented to realize one or more of the following potential advantages. The presently disclosed techniques provide a significant improvement in touch and/or gesture I/O using an interactive field sequential color (FSC) display. The FSC display includes a transparent substrate, such as a glass or other transparent material, which has a rear surface on which MEMS display components are disposed. The interactive display is configured to determine the location and/or relative motion of a user's touch or gesture proximate to the display, and/or to register an image of the object.

Particular implementations of the subject matter described in this disclosure can be implemented to realize one or more of the following potential advantages. The user's gesture may occur over a "full range" of view with respect to the interactive display. By "full range" is meant that the gesture may be recognized, at a first extreme, even when made very close to, or in physical contact with, the interactive display; in other words, "blind spots" exhibited by prior art camera systems are avoided. At a second extreme, the gesture may be recognized at a substantial distance, up to approximately 500 mm, from the interactive display, which is not possible with known projective capacitive systems. The above functionality may be provided by configuring the transparent substrate with a light turning arrangement thereby avoiding the cost and thickness associated with adding an additional light-guide layer.

FIG. 1A shows a block diagram of an example of an electronic device having an interactive display according to an implementation. An apparatus 100, which may be, for example, a personal electronic device (PED), may include an electronic display 110 and a processor 104. The electronic display 110 may be a touch screen display, but this is not necessarily so. In some implementations, the processor 104 may be configured to control an output of the electronic display 110, or an electronic device (not shown) communicatively coupled with apparatus 100. The processor 104 may control the output of the electronic display 110 in response, at least in part, to a user input. The user input may include a touch or a gesture, where the user gesture may include, for example, a gross motion of a user's appendage, such as a hand or a finger, or a handheld object or the like. The gesture may be located, with respect to the electronic display 110, at a wide range of distances. For example, a gesture may be made proximate to, or even in direct physical contact with the electronic display 110. Alternatively, the gesture may be made at a substantial distance, up to, approximately 500 mm from the electronic display 110. In some implementations, the processor 104 may be configured to collect and process data received from the electronic display 110 regarding the user input. The data may include a characteristic of a touch, gesture, or object related to the user input. The characteristic may include location and motion information of a touch or a gesture, or image data, for example.

An arrangement 130 (examples of which are described and illustrated herein below) may be disposed substantially parallel to a front surface of the electronic display 110. In an implementation, the arrangement 130 may be substantially transparent and optically coupled to the electronic display 110, such that at least most light emitted by a display lighting system (not shown) of the electronic display 110 is transmitted through the arrangement 130. The arrangement 130 may output one or more signals responsive to light received from the display lighting system and/or a source exterior to the electronic display 110. In some implementations, the signals may be responsive to light reflected into the arrangement 130 from a user's appendage, an object or a document, for example.

In some implementations, signals outputted by the arrangement 130, via a first signal path 103, may be analyzed by the processor 104 so as to recognize an instance of a user input, such as a touch or a gesture. The processor 104 may then control the electronic display 110, responsive to the user input, by way of signals sent to the electronic display 110 via a second signal path 105. In some implementations, signals outputted by the arrangement 130, via the first signal path 103, may be analyzed so as to obtain image data.

FIG. 1B and FIG. 1C show an example of an arrangement including a transparent substrate and a light sensor. In the illustrated implementation, the arrangement 130 includes a transparent substrate 135 and a light sensor 133. Referring now to FIG. 1B, which may be referred to as a perspective view, the arrangement 130 is illustrated as being disposed above and substantially parallel to an upper surface of the electronic display 110. The light sensor 133 is shown disposed proximate to the periphery of the transparent substrate 135. In the illustrated implementation, the perimeter of the transparent substrate 135 is substantially coextensive with the perimeter of the electronic display 110. Advantageously, the perimeter of the transparent substrate 135 is coextensive with, or is larger than and fully envelopes, the perimeter of the electronic display 110.

Although one light sensor 133 is shown in the illustrated implementation, it will be appreciated that numerous other arrangements are possible. Any number of light sensors may be used, and light sensors may be disposed on or near a single side, or adjacent or opposite sides, or three or four sides of the transparent substrate 135, for example. In some implementations, the light sensor 133 may be disposed above or below the transparent substrate 135. Advantageously, the light sensor 133 may be disposed near, either within or outside of, the perimeter of the transparent substrate 135. The light sensor 133 may include one or more photosensitive elements, such photodiodes, phototransistors, charge coupled device (CCD) arrays, complementary metal oxide semiconductor (CMOS) arrays or other suitable devices operable to output a signal representative of a characteristic of detected visible light. The light sensor 133 may output signals representative of color of detected light, for example. In some implementations, the signals may also be representative of other characteristics, including intensity, polarization directionality, frequency, amplitude, amplitude modulation, and/or other properties.

In the illustrated implementation, the light sensor 133 is disposed at the periphery of the transparent substrate 135. Alternative configurations are within the contemplation of the present disclosure, however. For example, the light sensor 133 may be remote from the transparent substrate 135, in which case light detected by the light sensor 133 may be received from the transparent substrate 135 by way of additional optical elements such as, for example, one or more optical fibers (not illustrated).

The transparent substrate 135 may be optically coupled to the electronic display 110. The transparent substrate 135 may be substantially transparent such that at least most light 143 from the electronic display 110 passes through the transparent substrate 135 and may be observed by a user (not illustrated).

The transparent substrate 135 may include a substantially transparent, relatively thin, overlay disposed on, or proximate to, the front surface of the electronic display 110. Advantageously, the transparent substrate 135, which may also be referred to herein as a top glass or MEMS glass, may be a substantially transparent material, such as a glass, having a rear surface 169 proximate to which components of electronic display 110 may be disposed. For example, a thin film transistor (TFT) layer, shutters, and associated microelectromechanical (MEM) components, as described in more detail hereinbelow may be disposed on or behind the rear surface 169.

In some implementations, for example, the transparent substrate 135 may be approximately 0.5 mm thick, while having a planar area in an approximate range of tens or hundreds of square centimeters. The transparent material may have an index of refraction greater than 1. For example, the index of refraction may be in the range of about 1.4 to 1.6. The index of refraction of the transparent material determines a critical angle 'α' with respect to a normal to the material surface such that a light ray intersecting the surface at an angle less than 'α' will pass through the surface, but a light ray intersecting the surface at an angle greater than 'α' will undergo total internal reflection (TIR).

As illustrated in FIG. 1C, when an object 150 interacts with light 142 (which may be referred to herein as "object illuminating light") from the electronic display 110, scattered light 144, resulting from the interaction, may be directed toward the transparent substrate 135. The object 150 may be, for example, a user's appendage, such as a hand or a finger, or it may be any physical object, hand-held or otherwise under control of the user, including a document to be imaged, but is herein referred to, for simplicity, as the "object."

The transparent substrate 135 may be configured to collect the scattered light 144. Advantageously, the transparent substrate 135 may include a light-turning arrangement that redirects the scattered light 144, toward the light sensor 133. The light-turning arrangement may include a number of light turning elements 166, described in more detail hereinbelow. Redirected scattered light 146 may be turned in a direction having a substantial component parallel to the upper surface of the electronic display 110. More particularly, at least a portion of the redirected scattered light 146 intersects a front surface 167 of the transparent substrate 135 and the rear surface 169 of the transparent substrate 135 only at an angle to normal greater than critical angle 'α' and, therefore, undergoes TIR. As a result, such redirected scattered light 146 does not pass through the front surface 167 or the rear surface 169 and, instead, reaches the light sensor 133. The light sensor 133 may be configured to detect one or more characteristics of the redirected scattered light 146, and output, to the processor 104, a signal representative of the detected characteristics. For example, the characteristics may include intensity, polarization, directionality, frequency, amplitude, amplitude modulation, and/or other properties.

In some implementations, the light turning elements 166 may include reflective or refractive microstructures, holographic film, volume holograms, and/or surface relief gratings that turn light by diffraction and/or surface roughness that turn light by scattering. In some implementations, the light turning elements 166 may be configured as films laminated to the transparent substrate 135. In some implementations, the light turning elements 166 may be configured as a dielectric or metal layer deposited on the transparent substrate 135. The light turning elements 166 may be holographic, diffractive, or refractive, for example.

In the illustrated implementation, the light turning elements 166 are shown to be disposed near the rear surface 169 of the transparent substrate 135, but other implementations are within the contemplation of the present disclosure. For example, the light turning elements 166 may be disposed near a front surface of the transparent substrate 135.

Referring again to FIG. 1A, the processor 104 may be configured to receive, from the light sensor 133, signals representative of the detected characteristics, via the first signal path 103. The processor 104 may be configured to recognize, from the output signals of the light sensor 133, an instance of a user gesture. Moreover, the processor 104 may control one or more of the electronic display 110, other elements of the apparatus 100, and/or an electronic device (not shown) communicatively coupled with apparatus 100. For example, an image displayed on the electronic display 110 may be caused to be scrolled up or down, rotated, enlarged, or otherwise modified. In addition, the processor 104 may be configured to control other aspects of the apparatus 100, responsive to the user gesture, such as, for example, changing a volume setting, turning power off, placing or terminating a call, launching or terminating a software application, etc.

Figure 2:
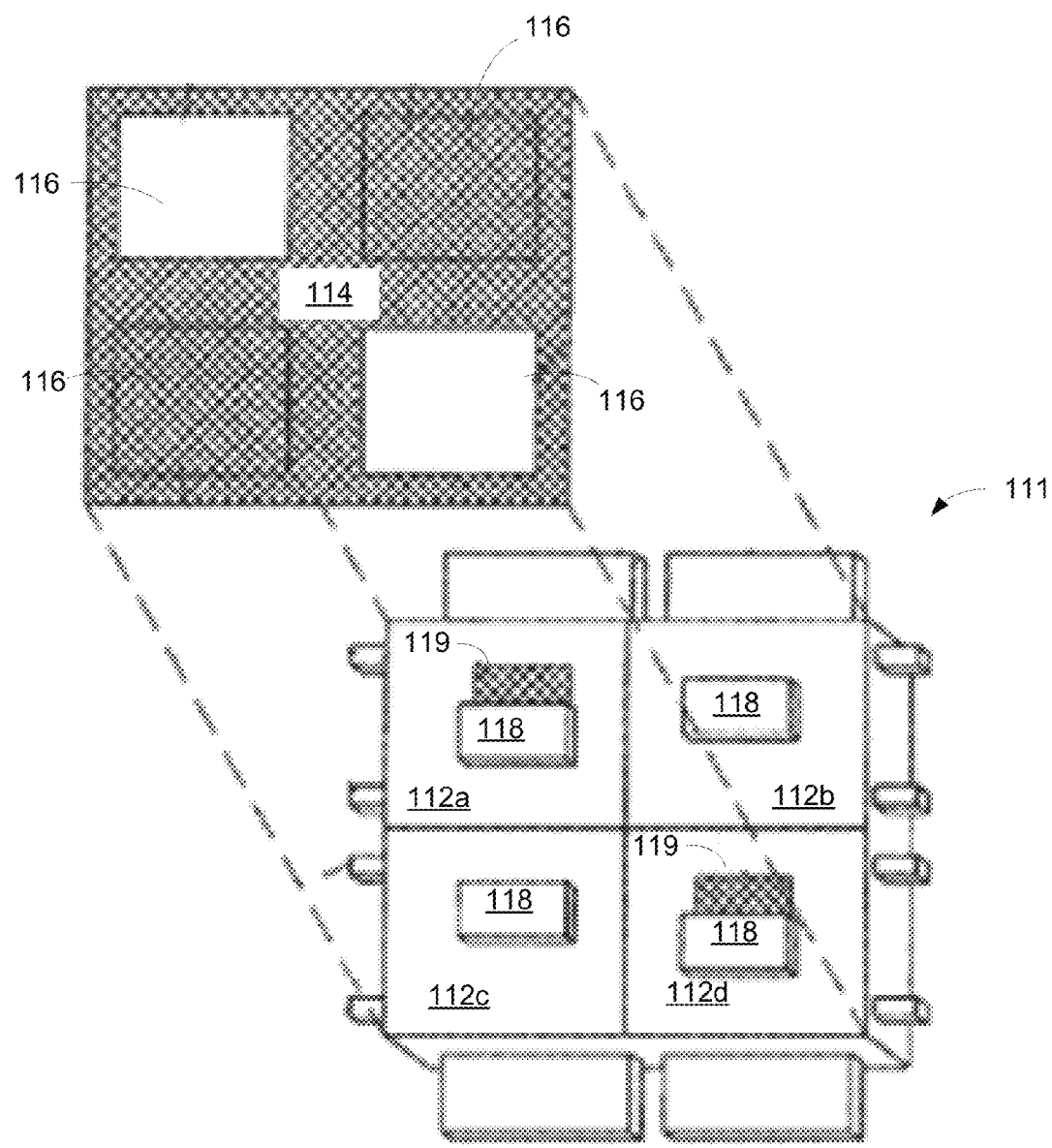
FIG. 2 illustrates a schematic diagram of an example of an arrangement for spatial light modulation of an interactive display.

The electronic display 110 may include an arrangement for spatial light modulation. FIG. 2 illustrates a schematic diagram of an example of an arrangement for spatial light modulation of an interactive display. The arrangement 111 (which may be referred to as the "light modulation array") may include a plurality of light modulators 112a-112d (generally, "light modulators 112") arranged in rows and columns.

Each light modulator 112 may include a corresponding aperture 119. Each light modulator 112 may also include a corresponding shutter 118, or another means to switch the corresponding aperture 119 between an open position and a shut position. In order to render an image 114, the electronic display 110 may be configured to switch the light modulators in a time domain in accordance with a particular modulation scheme (the "first modulation scheme"). For example, to illuminate a pixel 116 of the image 114, a shutter 118 corresponding to the pixel is in an open position that permits transmittance of light from a display lighting system (not illustrated) through the corresponding aperture 119 toward a viewer (not illustrated). To keep the pixel 116 unlit, the corresponding shutter 118 is positioned such that it blocks light transmission through the corresponding aperture 119. Each aperture 119 may be defined by an opening provided in a reflective or light-absorbing layer, for example.

In the illustrated configuration, light modulators 112a and 112d are switched to an open position, whereas light modulators 112b and 112c are switched to a shut position. As a result of selectively switching the positions of the light modulators 112a-112d in accordance with the first modulation scheme, the electronic display 110 may render the image 114, as describe in more detail herein below. In some implementations, the first modulation scheme may be controlled by a computer processing arrangement that may be part of or may be communicatively coupled with the processor 104.

Figure 3:
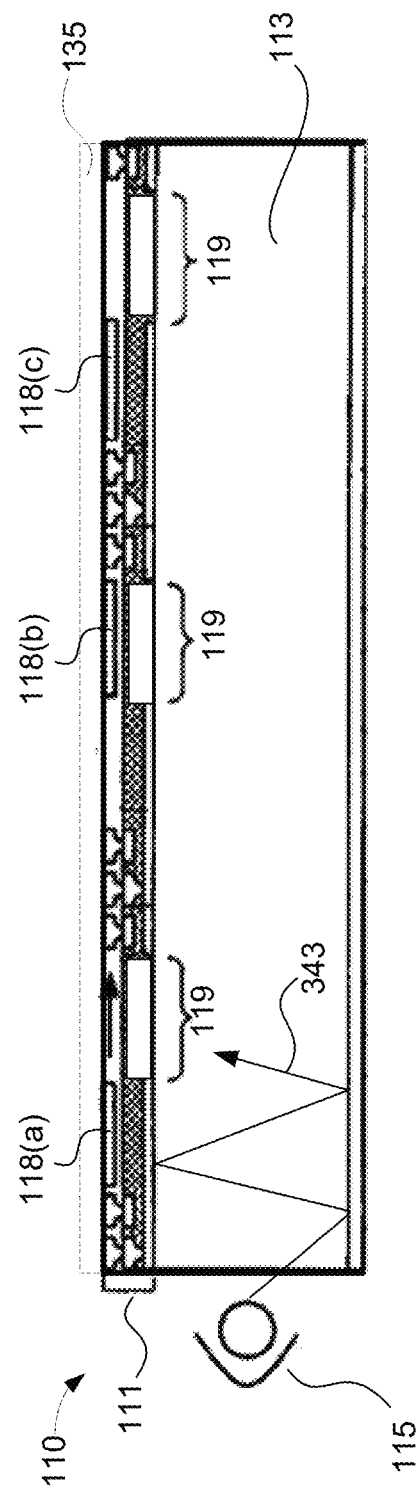
FIG. 3 is a cross sectional view of an electronic display incorporating a light modulation array.

FIG. 3 is a cross sectional view of an interactive display incorporating a light modulation array. The electronic display 110 includes the light modulation array 111, an optical cavity 113, and a display lighting system 115. The light modulation array 111 may include any number of light modulators 112, as described hereinabove and illustrated in FIG. 2. As shown in the implementation illustrated in FIG. 3, each light modulator may include a corresponding shutter 118 and be configured to be switched between an open position and a shut position. In the illustrated implementation, for example, the shutters 118(a) and 118(c) are depicted in the open position, whereas, the shutter 118(b) is depicted in the closed position. Advantageously, the light modulators may be disposed on or proximate to the rear surface 169 of the transparent substrate 135.

In some implementations, the optical cavity 113 may be formed from a light guide that may be about 300 microns to about 2 mm thick, for example. The display lighting system 115 may be configured to emit light 343 into the optical cavity 113. Advantageously, at least a portion of the light 343 may undergo TIR and be distributed substantially uniformly throughout the optical cavity 113 as a result of judicious placement of light scattering elements (not illustrated) on one or more surfaces enclosing the optical cavity 113. For example, some light scattering elements may be formed in or on the rear enclosure of the optical cavity 113 to aid in redirecting the light 343 through the apertures 119.

The electronic display 110 may be referred to as a field sequential color (FSC) display, because, in some implementations, images are rendered by operating the display lighting system 115 so as to sequentially alternate the color of visible light emitted by the display lighting system 115. For example, the display lighting system 115 may emit a sequence of separate flashes of red, green and blue light. Synchronized with the sequence of flashes, a sequence of respective red, green and blue images may be rendered by appropriate switching, in accordance with the first modulation scheme, of the light modulators 112 in the light modulation array 111 to respective open or shut positions.

As a result of the persistence of vision phenomenon, a viewer of rapidly changing images, for example, images changing at frequencies of greater than 20 Hz, may perceive an image which is the combination, or approximate average, of the images displayed within a particular period. In some implementations, the first modulation scheme may be adapted to utilize this phenomenon so as to render color images while using as few as a single light modulator for each pixel of a display.

For example, in a color FSC display, the first modulation scheme may include dividing an image frame to be displayed into a number of sub-frame images, each corresponding to a particular color component (for example, red, green, or blue) of the original image frame. For each sub-frame image, the light modulators of the display are set into states corresponding to the color component's contribution to the image. The light modulators then are illuminated by a light emitter of the corresponding color. The sub-images are displayed in sequence at a frequency (for example, greater than 60 Hz) sufficient for the brain to perceive the series of sub-frame images as a single image.

As a result, an FSC display may require only a single light modulator per pixel, instead of a pixel requiring a separate spatial light modulator for each of three or more color filters. Advantageously, an FSC display may not suffer a loss of power efficiency due to absorption in a color filter and may make maximum use of the color purities available from modern light emitting diodes (LEDs), thereby providing a range of colors exceeding those available from color filters, i.e. a wider color gamut.

Figure 4:
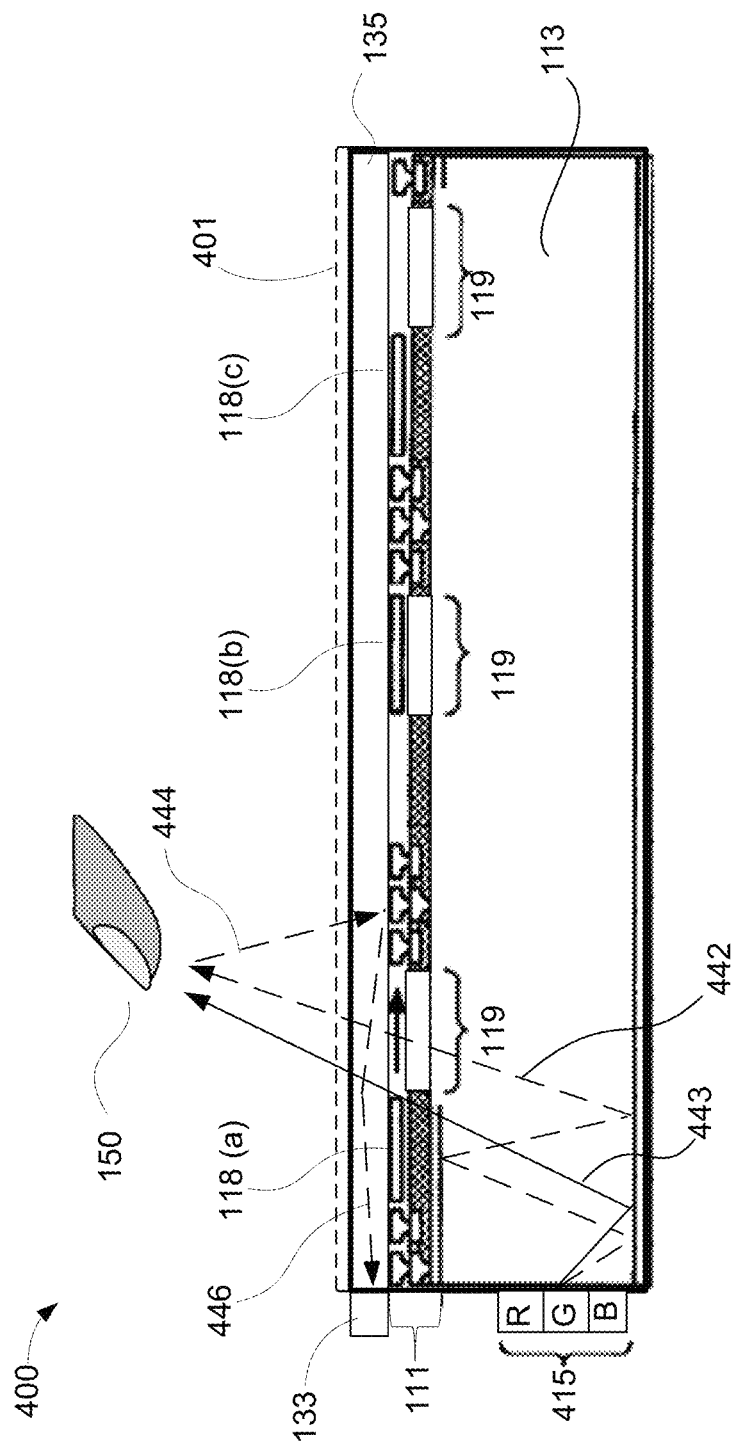
FIG. 4 illustrates an example of an interactive display according to an implementation.

FIG. 4 illustrates an example of an interactive display according to an implementation. In the illustrated implementation, an interactive FSC display 400 includes a front surface 401, the transparent substrate 135, the light sensor 133, the light modulation array 111, the optical cavity 113 and a display lighting system 415. The interactive FSC display 400 may be configured to render color images, visible to a user through the front surface 401, by sequentially flashing one or more wavelength specific light emitters of the display lighting system 415 into the optical cavity 113, while synchronously performing spatial light modulation according to the first modulation scheme. In the illustrated implementation, the display lighting system 415 includes three wavelength specific light emitters, designated R (red), B (blue) and G (green). It will be appreciated, however, that other arrangements of wavelength specific light emitters are possible. For example, in addition to, or instead of one or more of the RGB light emitters, light emitters of white, yellow, or cyan color may be included in the display lighting system 415.

In the illustrated implementation, the display lighting system 415 is a backlight, however implementations including only a frontlight or both a frontlight and a backlight are within the contemplation of the present disclosure.

The light modulation array 111 may include an array of light modulators as described hereinabove. As shown in the illustrated implementation, each light modulator may include corresponding shutter 118 and be configured to be switched between an open position and a shut position. For example, in the illustrated implementation, the shutters 118(a) and 118 (c) are each in the open position, and the shutter 118(b) is in the closed position. Advantageously, the light modulators may be disposed on or proximate to the rear surface 169 of the transparent substrate 135.

In some implementations, the transparent substrate 135 may be disposed between the display lighting system 415 and the front surface 401. The transparent substrate 135 may be substantially parallel to the front surface 401 and have a periphery at least coextensive with a viewing area of the interactive FSC display 400.

As illustrated in FIG. 4, when the object 150 interacts with object illuminating light 442, scattered light 444, resulting from the interaction, may be directed toward the transparent substrate 135. The object 150 may be, for example, a user's appendage, such as a hand or a finger, or it may be any physical object, hand-held or otherwise under control of the user, including a document to be imaged, but is herein referred to, for simplicity, as the "object."

The transparent substrate 135 may be configured to collect the scattered light 444. Advantageously, the transparent substrate 135 may include a light-turning arrangement (not illustrated) that redirects the scattered light 444 toward the light sensor 133. Redirected scattered light 446 may be turned in a direction having a substantial component parallel to the front surface 401. More particularly, at least a portion of the redirected collected scattered light 446 may be redirected at an angle to normal greater than critical angle 'a' and, therefore, may undergo TIR until reaching the light sensor 133. The light sensor 133 may be configured to detect one or more characteristics of the redirected scattered light 446, and output, to a processor (not illustrated), a signal representative of the detected characteristics. For example, the characteristics may include intensity, polarization, directionality, frequency, amplitude, amplitude modulation, and/or other properties.

Although a single light sensor 133 is illustrated in FIG. 4, it will be appreciated that any number of light sensors 133 may be disposed about or proximate to a periphery of the transparent substrate 135. In various implementations contemplated by the present disclosure, the number of light sensors may range from about four light sensors to some thousands of light sensors, for example.

In some implementations, there may be one or more optical components disposed between the transparent substrate 135 and the light sensor 133. For example, an aperture array, a mask, a lens, a lens array, or another method of focusing light, increasing efficiency, or better discriminating angular versus spatial information for the redirected scattered light 446 may be provided.

Spatial light modulation may be performed to produce a rendered image by switching a selected subset of the shutters 118 to an open position in accordance with the first modulation scheme. In some implementations, switching of the shutters 118 may be performed in synchronization with sequential flashing of the one or more wavelength specific light emitters of the display lighting system 415.

For example, a green wavelength specific light emitter of the display lighting system 415 may be configured to emit light 443 ("image rendering light") into the optical cavity 113. Advantageously, at least a portion of the image rendering light 443 may undergo TIR and be distributed substantially uniformly throughout the optical cavity 113. A portion of the image rendering light 443 may be transmitted through one or more of the apertures 119 and contribute to the rendered image.

In the illustrated implementation, the green light emitter of the display lighting system 415 is also configured to emit the object illuminating light 442 into the optical cavity 113. At least a portion of the object illuminating light 442 may undergo TIR and be distributed substantially uniformly throughout the optical cavity 113.

It should be noted that, in the illustrated implementation, the object illuminating light 442 and the image rendering light 443 are depicted as geometrically different ray traces only for clarity of illustration, and that the primary distinction between the object illuminating light 442 and the image rendering light 443 is temporal and/or spectral, rather than spatial. In the illustrated implementation, for example, where the image rendering light 443 and the object illuminating light 442 may have the same wavelength, the image rendering light 443 and the object illuminating light 442 may be emitted by the display lighting system 415 at different times, for example as part of different sub-frames. As a further example, the object illuminating light 442 may be visible light emitted during a document scanning operation during which the display viewing area is not ordinarily observable by a user.

In some implementations, the object illuminating light 442 may be light of a different wavelength than the image rendering light 443. For example, the object illuminating light 442 may be of a nonvisible wavelength such as infrared (IR) or near IR. In such implementations, temporal separation between the object illuminating light 442 and the image rendering light 443 may or may not also be provided.

The present inventors have appreciated that an optical touch and gesture recognition functionality, as well as a document scanning capability, may be provided by using the object illuminating light 442. More particularly, light modulators may be switched in accordance with a second modulation scheme to selectively pass the object illuminating light 442 through at least one of the respective apertures, the object illuminating light 442 being at least partially unrelated to the rendered image. In some implementations, a document scanning capability may also be provided by substantially similar hardware.

Advantageously, the second modulation scheme may provide that the object illuminating light 442 is passed only when there is one or both of temporal separation and spectral separation with respect to the image rendering light 443. In some implementations, the second modulation scheme may provide for interspersing of sub-frames during which the object illuminating light 442 is passed with sub-frames during which the image rendering light 443 is passed. For example, where the object illuminating light 442 is at an IR wavelength, and the image rendering light 443 is passed in a series of groups of sub-frames of visible red, green and blue image patterns, the second modulation scheme may provide that an IR emitter is flashed between each group of sub-frames. In some implementations a group of sub-frames may include ten sub-frames each of visible red, green and blue image patterns, for example.

In some implementations, the second modulation scheme may provide, periodically, a "blank" sub-frame, during which the display lighting system is caused to turn off all light sources. During such a blank sub-frame, a level of ambient light proximate to the interactive FSC display 400 may be determined, for example.

Figure 5:
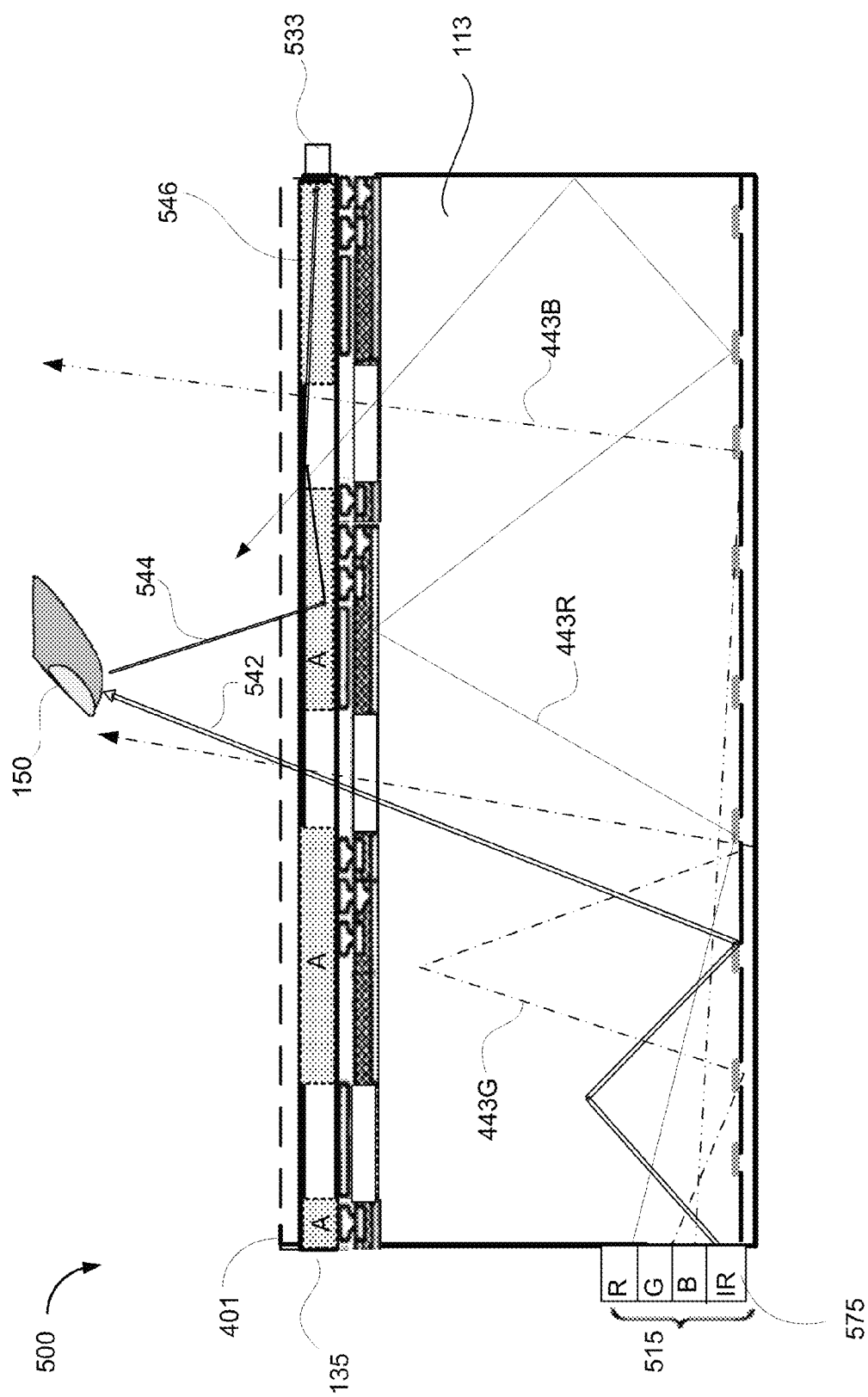
FIG. 5 illustrates a further example of an interactive display, according to an implementation.

FIG. 5 illustrates a further example of an interactive display, according to an implementation. In the illustrated implementation, the interactive FSC display 500 includes an IR emitter 575 that may be configured to emit IR light into the optical cavity 113. Emitted IR light 542 may strike the object 150 and be scattered back toward the front surface 401. The object may be on or above the front surface 401. Scattered light 544 resulting from interaction of the emitted IR light 542 with the object 150 may interact with a light-turning arrangement (not shown) within the transparent substrate 135 so as to be turned ("redirected") toward an IR sensor 533. The IR sensor 533 may be configured to output, to a processor (not shown), a signal representative of a characteristic of redirected scattered light 546. The processor may be configured to recognize, from the output of the IR sensor 533, the characteristic of the object 150.

In some implementations, a wavelength of the IR light may be within a range that inexpensive silicon detectors may detect (700 nm to 1000 nm wavelength, for example).

The light-turning arrangement may be configured to capture light that is coming into the transparent substrate 135 via the front surface 401 of the interactive display and turn the captured light toward the periphery of the transparent substrate 135. More particularly, the scattered light 544 may be redirected to an angle larger than the critical angle of the glass or other transparent material of which the transparent substrate 135 may be composed. The redirected scattered light 546 may be guided by total-internal-reflection (TIR) within the transparent substrate 135 to the edges of the transparent substrate 135. The light turning arrangement may include elements disposed on either or both of an upper and lower surface of the first light guide transparent substrate 135 and may include holographic, diffractive, refractive, and/or reflective elements.

In some implementations, the light turning elements may be selectively located in areas not directly above the pixel apertures, e.g. in regions 'A' of transparent substrate 135. Advantageously, because the shutter aperture area of an FSC display is a relatively small fraction (e.g., one tenth to one half) of a total viewing area of the interactive FSC display 500, a significant portion of the transparent substrate 135 may be occupied by light turning elements without any appreciable quality degradation of a displayed image.

Figure 6:
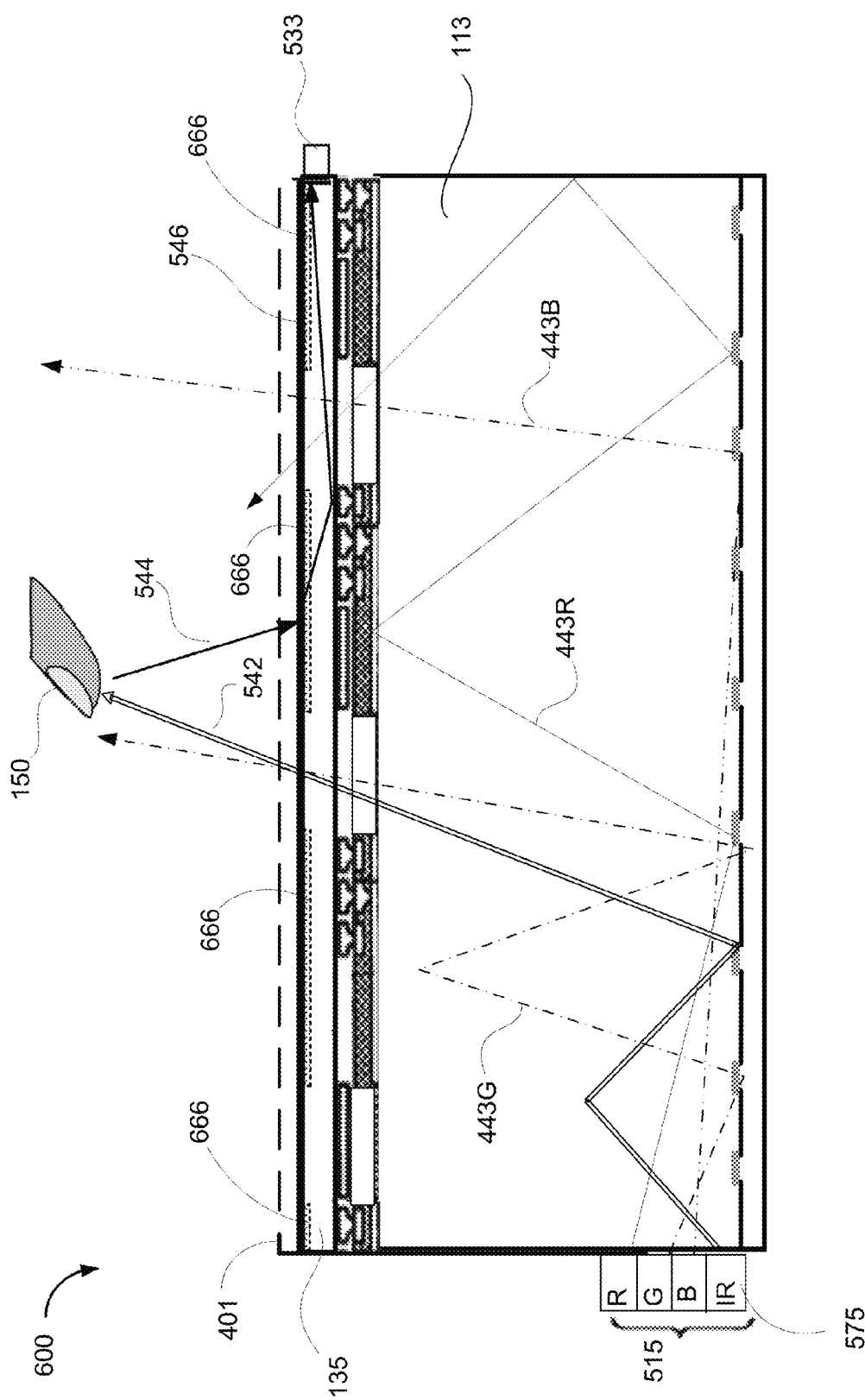
FIG. 6 illustrates a yet further example of an interactive display, according to an implementation.

FIG. 6 illustrates a yet further example of an interactive display, according to an implementation. In the illustrated implementations, the interactive FSC display 600 includes light turning elements 666 disposed proximate to an upper surface of the transparent substrate 135. The light turning elements 666 may serve to redirect scattered light 544, via refraction or diffraction for example, so that the redirected scattered light 546 undergoes TIR within the transparent substrate 135. In some implementations, the light turning elements 666 may be configured as films laminated to the transparent substrate 135. In some implementations, the light turning elements 666 may be configured as a dielectric or metal layer deposited on the transparent substrate 135. The light turning elements 666 may be holographic, diffractive, or refractive, for example.

Figure 7:
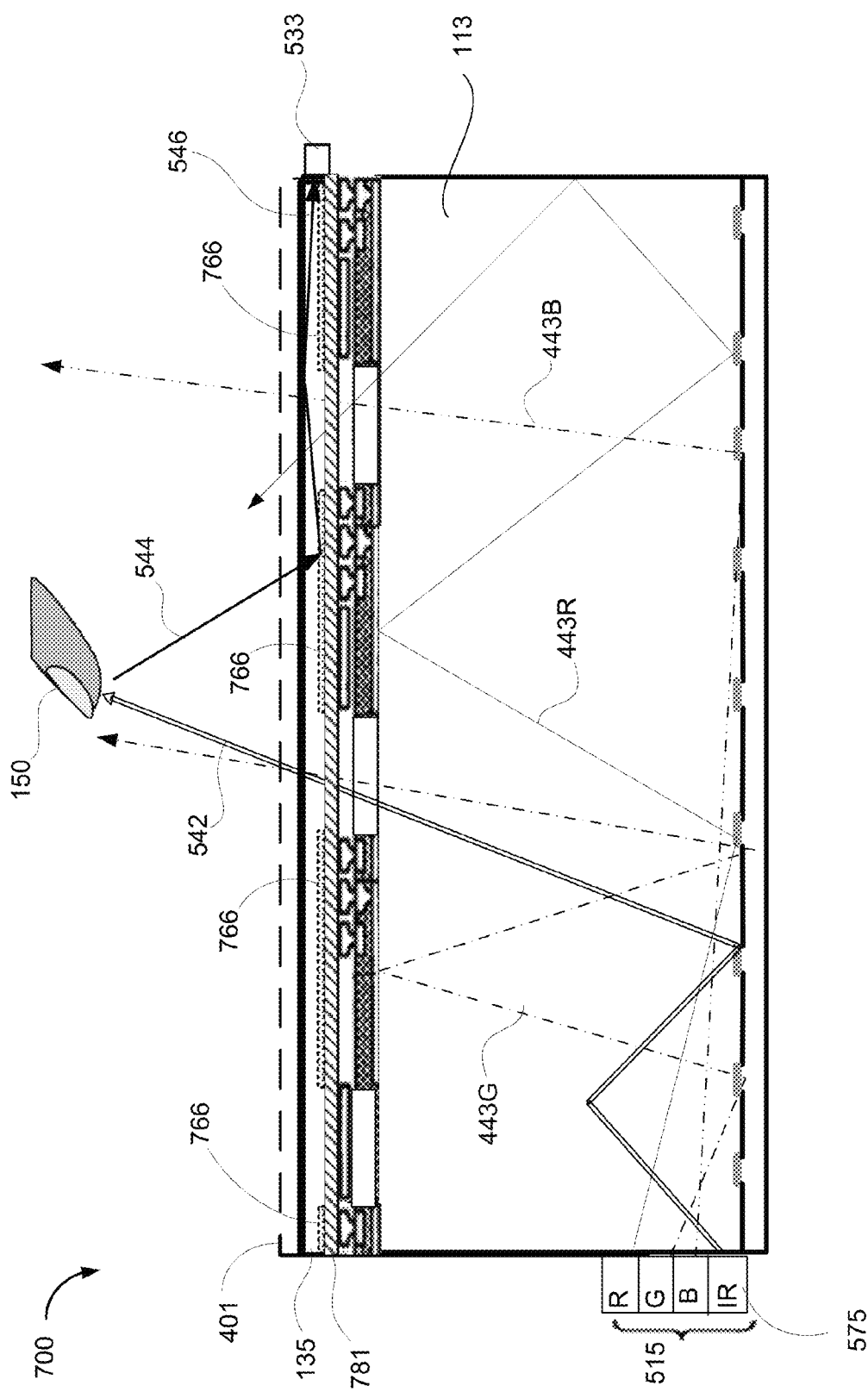
FIG. 7 illustrates another example of an interactive display, according to an implementation.

FIG. 7 illustrates another example of an interactive display, according to an implementation. In the illustrated implementations, the interactive FSC display 700 includes light turning elements 766 disposed proximate to a lower surface of transparent substrate 135. The light turning elements 766 may serve to redirect scattered light 544, via reflection or refraction for example, so that redirected scattered light 546 undergoes TIR within transparent substrate 140. In some implementations, the light turning elements 766 may be deposited and/or patterned onto the transparent substrate 140 prior to fabrication of TFT layer 781 onto transparent substrate 135. In some implementations, the light turning elements 766 may be configured as geometric refractive or reflective features such as cones or pyramids, for example.

Figure 8:
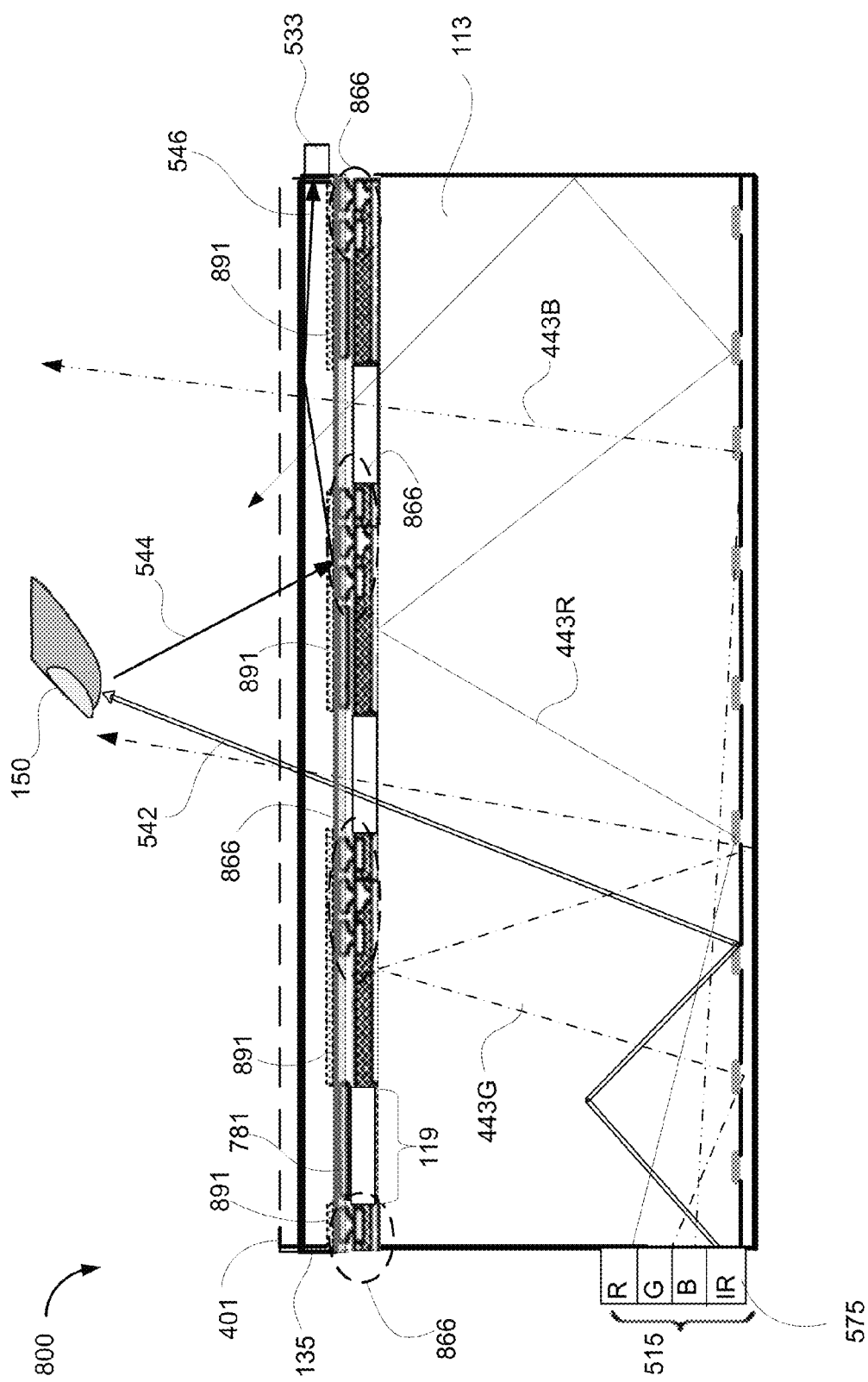
FIG. 8 illustrates a further example of an interactive display, according to an implementation.

FIG. 8 illustrates a further example of an interactive display, according to an implementation. In the illustrated implementations, the interactive FSC display 800 includes micro structures 866 disposed within TFT layer 781 that may be used as light turning elements. Micro structures 866 may include TFT circuitry and/or structures associated with support and control of shutters 118 (FIG. 3). In the implementation illustrated in FIG. 8, microstructures 866 may serve to redirect the scattered IR light 544 into the transparent substrate 135. In some implementations, a partial layer 891 of a coating material or mask may be disposed proximate to a back surface of the transparent substrate 135. In some implementations, the partial layer 891 may be opaque to visible light but be substantially transparent to IR light. Advantageously, the partial layers 891 may be selectively located in regions of transparent substrate 135 spatially removed from corresponding apertures 119.

Microstructures 866 may be disposed so as to selectively redirect scattered light 544 of a particular wavelength. For example, where scattered light 544 is IR light, a layout of microstructures 866 may be configured to have line spacing similar to the groove spacing of an optical grating optimized for IR light.

As indicated above, outputs of the IR sensor 533 may indicate one or more characteristics of the object 150. Such characteristics include location, motion, and image characteristics of the object 150. Particular implementations for obtaining location and motion characteristics, which may relate to a user input including a touch or a gesture, are described hereinbelow. In such implementations, the second modulation scheme may include selectively opening of light modulators according to one or more scanning patterns. A scanning pattern may be selected in view of a combination of various configurations of one or more light sensors and light turning arrangements. In order to provide a better understanding of features and benefits of the presently disclosed techniques, illustrative examples of scanning patterns will now be described.

Figure 9:
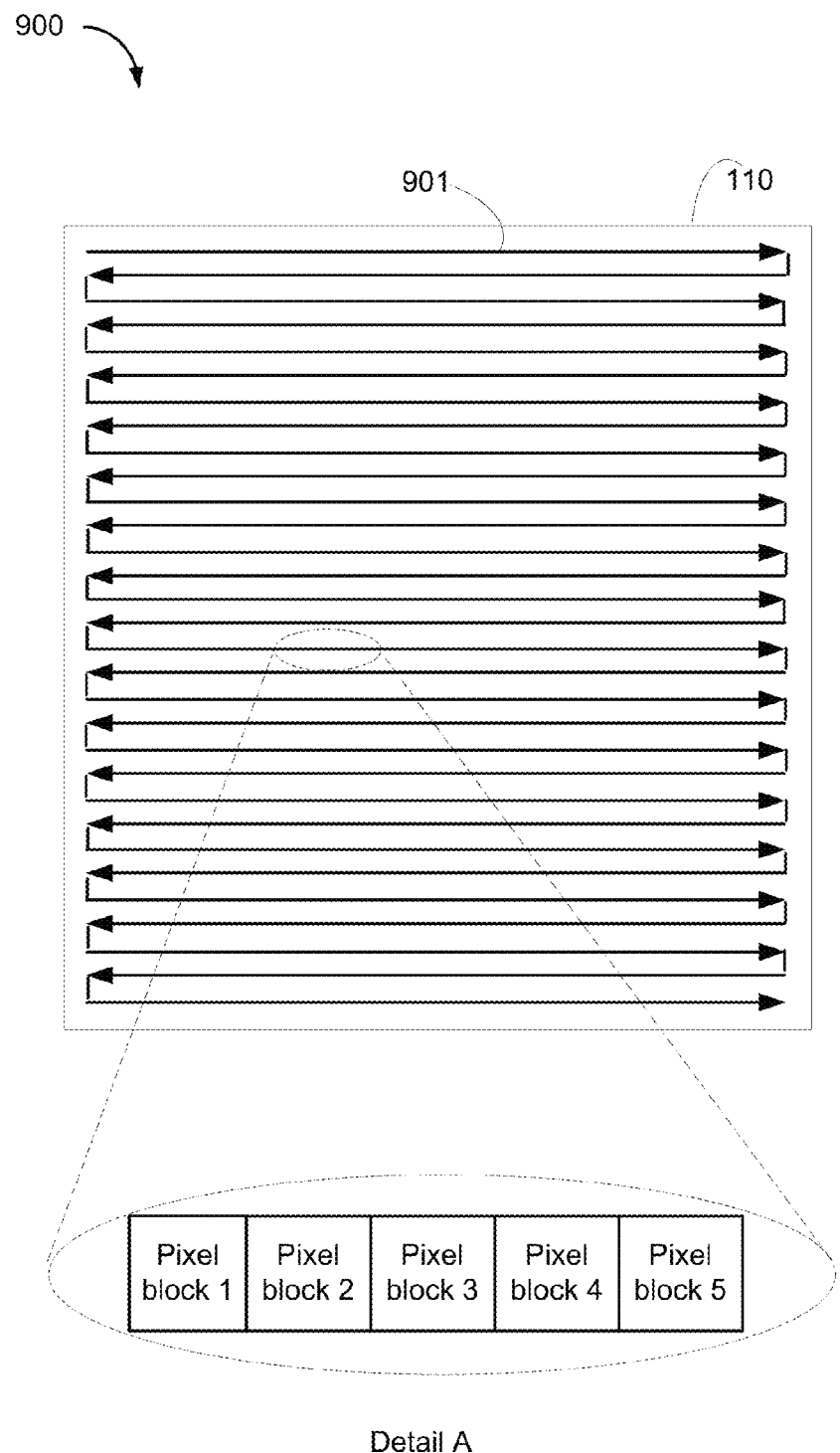
FIG. 9 illustrates an example of a scanning pattern for a second modulation scheme in accordance with some implementations.

In some implementations, a scanning pattern may resemble a raster scan. FIG. 9 illustrates an example of a scanning pattern for a second modulation scheme in accordance with some implementations. In the illustrated arrangement 900, the second modulation scheme includes selectively switching of light modulators to the open position in a temporal sequence according to a scanning pattern 901. As a result, object illuminating light may be passed through a sequentially through a series of apertures, or blocks of apertures according to the scanning pattern 901, where each aperture is associated with a respective pixel. As a result, substantially all of the viewing area of the electronic display 110 may be encompassed by the scanning pattern 901.

In some implementations, a raster scan line may be composed of a series of adjacent apertures. However, taking into account that apertures are typically much smaller in size than the object 150, it may be advantageous to scan blocks of apertures. For example, referring to Detail A, each pixel block may include multiple apertures and be approximately one to 25 square millimeters in size. Two or more blocks in a successive series of blocks of apertures may include at least some apertures in common. That is, in some implementations, there may be an overlap of apertures between a first block of apertures and a second, succeeding or preceding block of pixels.

It will be appreciated that the illustrated scanning pattern 901 is only an illustrative aspect of a feature of the second modulation scheme. Other scanning patterns are within the contemplation of the present disclosure. For example, a spiral scanning pattern may be implemented.

Figure 10:
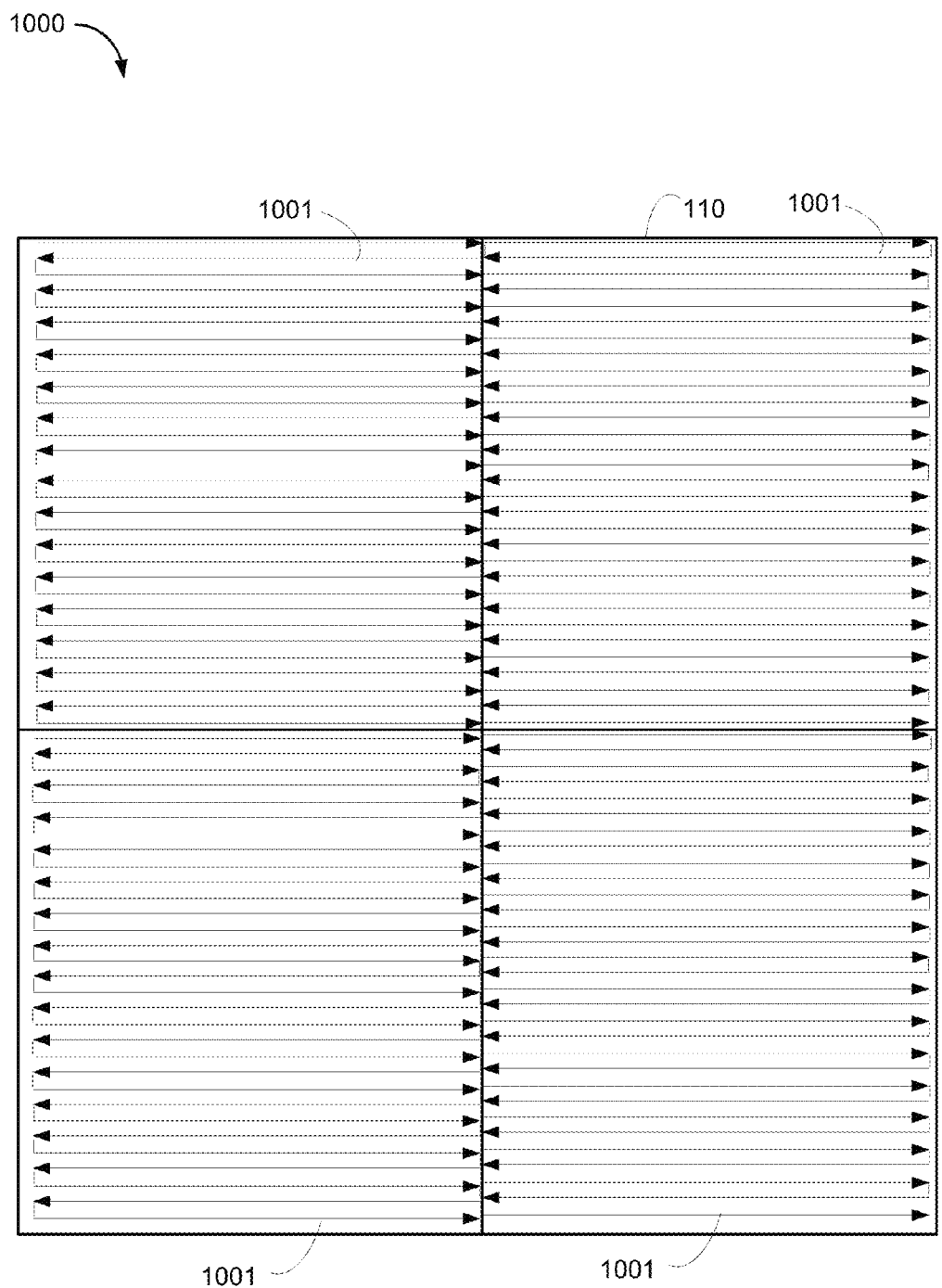
FIG. 10 illustrates a further example of a scanning pattern for a second modulation scheme in accordance with some implementations.

FIG. 10 illustrates a further example of a scanning pattern for a second modulation scheme in accordance with some implementations. In such implementation, a total viewing area of the electronic display 110 is treated as separate regions, with each separate region being separately scanned. In the illustrated implementation 1000, for example, the total viewing area of the electronic display 110 is treated as four separate quadrants. Scanning of each region by way of a scanning pattern 1001 may be performed, advantageously, in parallel. As a result, in each sub-frame in which object illuminating light is to be emitted through an open aperture, at least one aperture of a respective scanning pattern in each quadrant may be switched to an open position. Although in the illustrated implementation, a similar scanning pattern 1001 is executed in four similarly sized quadrants, it will be appreciated that other arrangements are within the contemplation of the present disclosure. One or more the separate regions may be of a different size, for example. As a further example, a scanning pattern for any region may be different from a scanning pattern region for another region.

It will be appreciated that selectively switching of light modulators to the open position in a temporal sequence according to a scanning pattern as described above may be performed in synchronization with flashes of one or more wavelength specific light emitters of the display lighting system 415. Referring again to FIG. 5, blocks of light modulators may be switched to the open position sequentially according to the scanning, in synchronization with flashes of IR emitter 575, for example. In the illustrated implementation a display lighting system 515 included the IR emitter 575, but this is not necessarily so. When the object 150 is approximately above a block of light modulators switched to the open position, the object 150 will interact with the emitted IR light 542. The scattered light 544 resulting from interaction of the emitted IR light 542 with the object 150 may interact with a light-turning arrangement (not shown) within the transparent substrate 135 so as to be turned ("redirected") toward the IR sensor 533. The IR sensor 533 may be configured to output, to a processor (not shown), a signal representative of a characteristic of the received, redirected scattered light 546. The processor may be configured to recognize, from the output of the IR sensor 533, the characteristic of the object 150, such as location and relative motion, for example.

As noted above, a scanning pattern may be selected in view of a combination of various configurations of one or more light sensors and light turning arrangements. In order to provide a better understanding of features and benefits of the presently disclosed techniques, illustrative examples of various configurations of light sensor and light turning arrangements will now be described.

Figure 11:
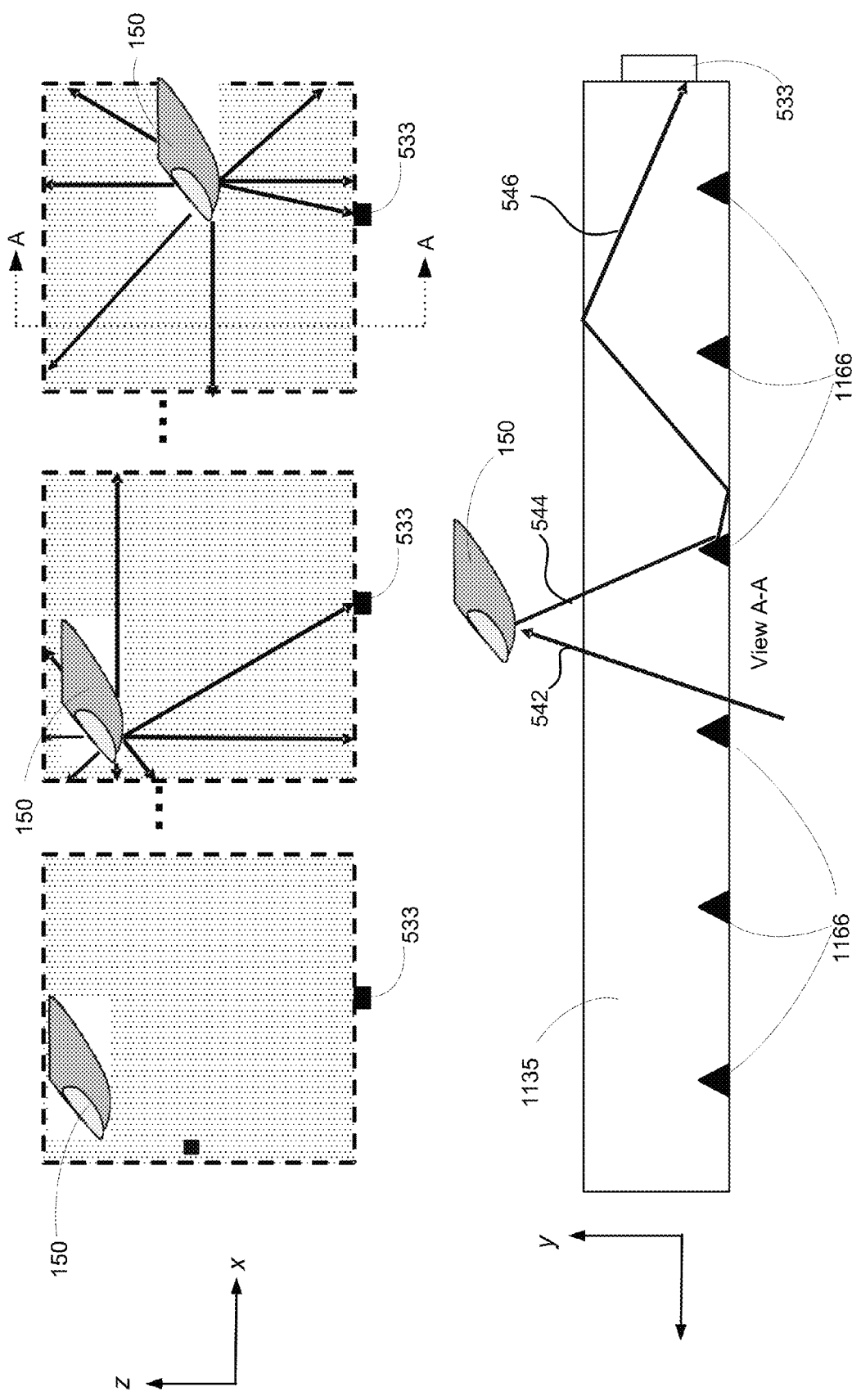
FIG. 11 shows an example of a light turning arrangement and light sensors, according to an implementation.

FIG. 11 shows an example of a light turning arrangement and light sensors, according to an implementation. The illustrated implementation includes a single IR light sensor 533 and a transparent substrate 1135 including a light turning arrangement that includes light turning elements 1166 that, at least in aggregate, turn the scattered light 544 in a substantially omnidirectional manner. The light turning elements 1166 may include microstructures such as reflective or refractive cones, screen printed scattering dots, bubbles, hologram, diffractive features, or the like. The scattered light 544 received by the transparent substrate 1135, interacting with such light turning elements, may be turned omnidirectionally in the x-z plane by the light turning arrangement. The redirected scattered light 546 may be turned in a direction having a substantial component parallel to the upper surface x-z plane, and undergo TIR. As a result of omnidirectionally turning the scattered light 544, a portion of the redirected scattered light 546 will reach the light sensor 533.

Light modulators may be selectively switched to the open position in a temporal sequence according to a scanning pattern in synchronization with flashes of one or more IR light emitters of the display lighting system. When the object 150 is approximately above a light modulator, or block of light modulators, switched to the open position, the object 150 may interact with the emitted IR light 542. The scattered light 544 resulting from interaction of the emitted IR light 542 with the object 150 may interact with the light-turning arrangement, as described above, and the portion of redirected scattered light 546 may reach the IR light sensor 533. IR light sensor 533 may be configured to output, to a processor (not shown), a signal representative of a characteristic of the received, redirected scattered light 546. The processor may be configured to recognize, from the output of the IR sensor 533, the location and/or relative motion of the object 150, for example.

Figure 12:
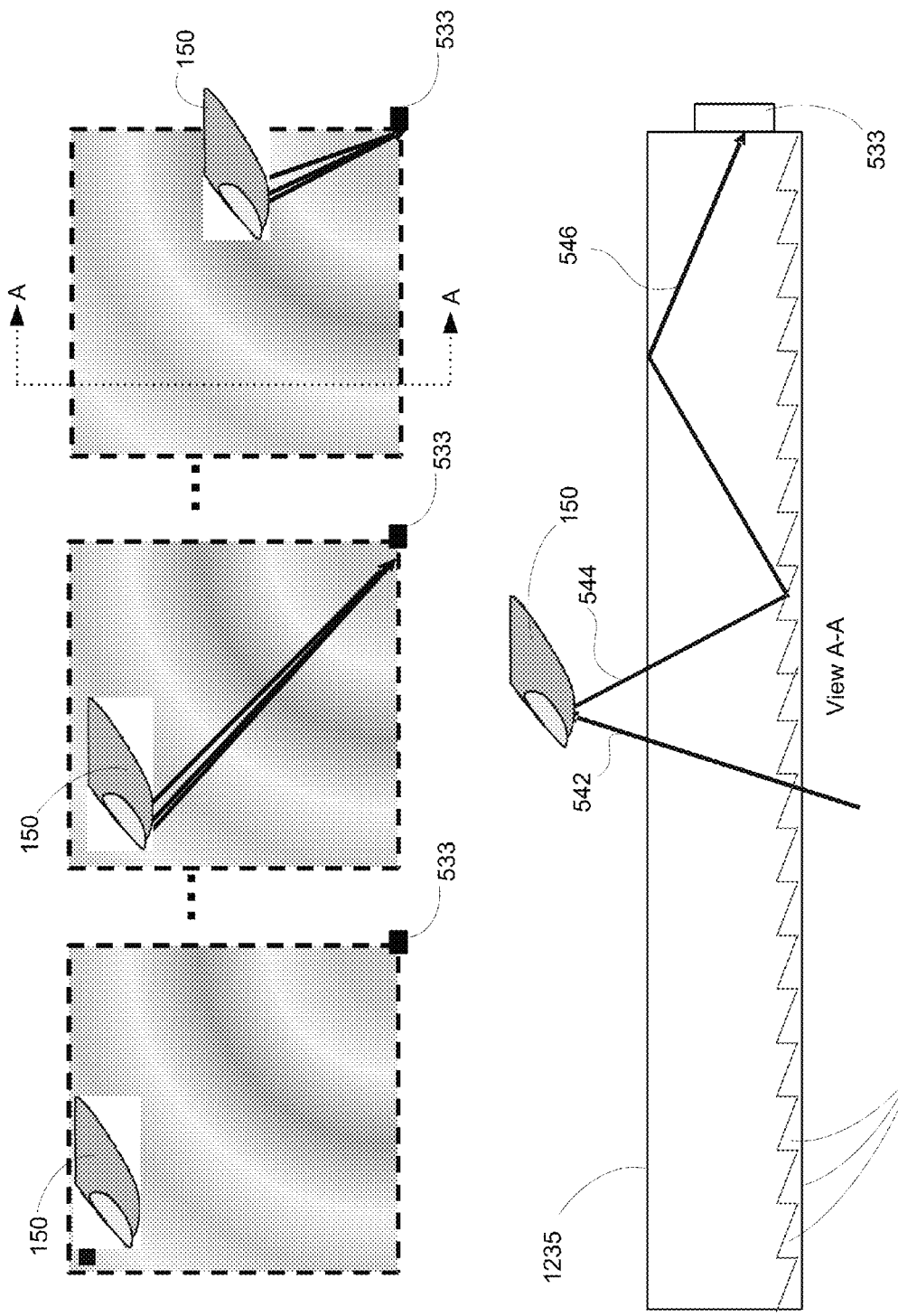
FIG. 12 shows an example of a light turning arrangement and light sensors, according to a further implementation.

FIG. 12 shows an example of a light turning arrangement and light sensors, according to a further implementation. The illustrated implementation includes a single IR light sensor 533 and a transparent substrate 1235 including a light turning arrangement that includes light turning elements 1266 that, at least in aggregate, turn the scattered light 544 toward a focal point. The light turning elements 1266 may be configured with directional turning features, such as curvilinear grooves or ridges, holographic, or diffractive features, for example.

Advantageously, the scattered light 544 received by the transparent substrate 1235, interacting with such light turning elements, may be turned directionally toward the IR light sensor 533. The redirected scattered light 546 may be turned in a direction having a substantial component parallel to the upper surface x-z plane, and undergo TIR. As a result of directionally turning the scattered light 544, at least a large fraction of the redirected scattered light 546 may reach the IR light sensor 533.

Light modulators may be selectively switched to the open position in a temporal sequence according to a scanning pattern in synchronization with flashes of one or more IR light emitters of the display lighting system. When the object 150 is approximately above a light modulator, or block of light modulators, switched to the open position, the object 150 may interact with the emitted IR light 542. The scattered light 544 resulting from interaction of the emitted IR light 542 with the object 150 may interact with the light-turning arrangement, as described above, and the portion of the redirected scattered light 546 may reach the IR light sensor 533. The IR light sensor 533 may be configured to output, to a processor (not shown), a signal representative of a characteristic of the redirected scattered light 546. The processor may be configured to recognize, from the output of the IR sensor 533, the location and/or relative motion of the object 150, for example.

Figure 13:
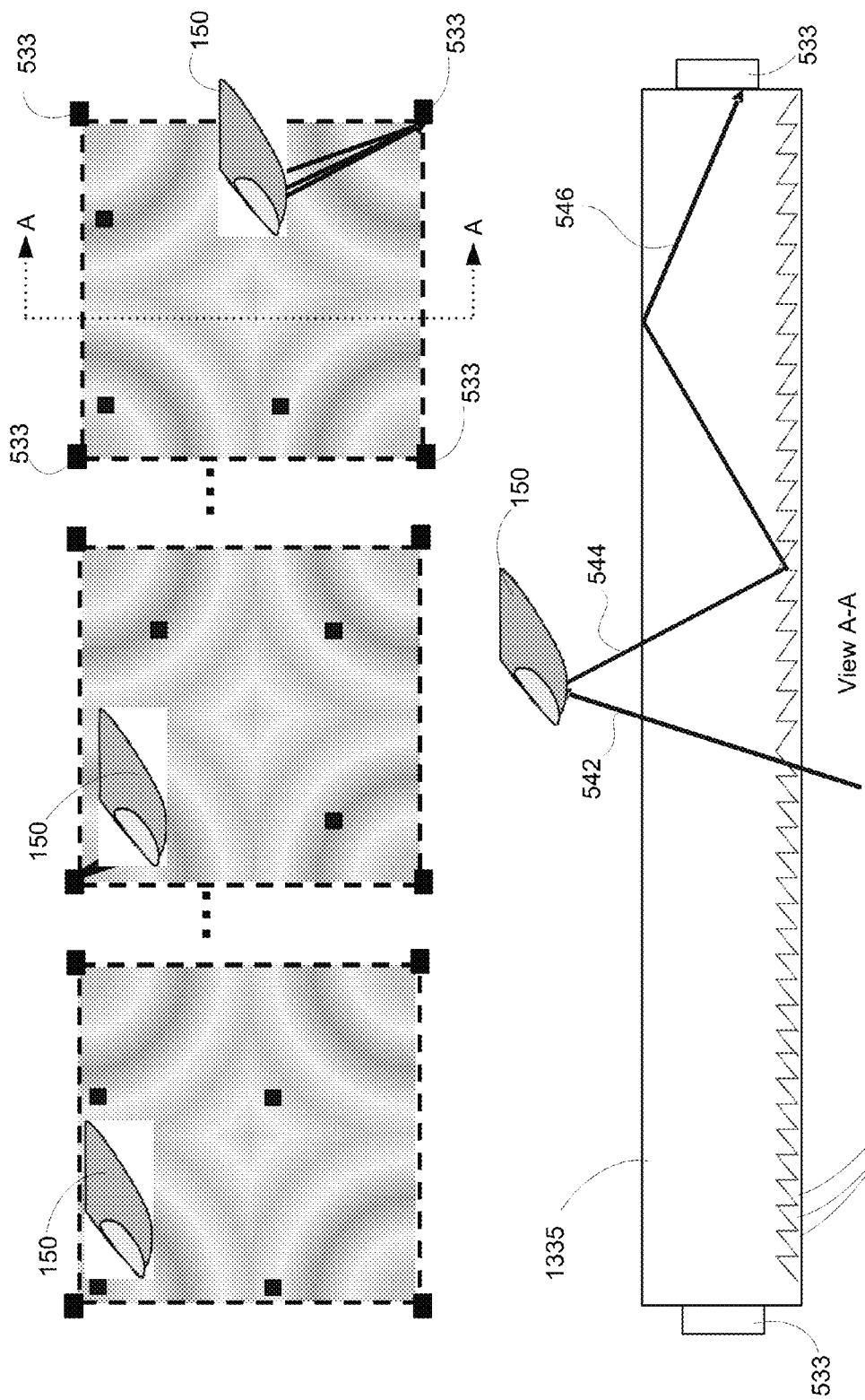
FIG. 13 shows an example of a light turning arrangement and light sensors, according to another implementation.

FIG. 13 shows an example of a light turning arrangement and light sensors, according to a yet further implementation. The illustrated implementation includes four IR light sensors 533 and a transparent substrate 1335. The transparent substrate 1335 includes a light turning arrangement that includes four regions, each region including light turning elements 1366 that, at least in aggregate, turn the scattered light 544 toward a respective focal point. The light turning elements 1366 may be configured with directional turning features, such as curvilinear grooves or ridges, holographic, or diffractive features, for example.

Advantageously, the scattered light 544 received by the transparent substrate 1335, interacting with such light turning elements, may be turned directionally toward the respective IR light sensor 533. The redirected scattered light 546 may be turned in a direction having a substantial component parallel to the upper surface x-z plane, and undergo TIR. As a result of directionally turning the scattered light 544, at least a large fraction of the redirected scattered light 546 may reach the respective IR light sensor 533.

Light modulators may be selectively switched to the open position in a temporal sequence according to a scanning pattern in synchronization with flashes of one or more IR light emitters of the display lighting system. When the object 150 is approximately above a light modulator, or block of light modulators, switched to the open position, the object 150 may interact with the emitted IR light 542. The scattered light 544 resulting from interaction of the emitted IR light 542 with the object 150 may interact with the light-turning arrangement, as described above, and the large fraction of the redirected scattered light 546 may reach the respective IR light sensor 533. Each IR light sensor 533 may be configured to output, to a processor (not shown), a signal representative of a characteristic of the redirected scattered light 546. The processor may be configured to recognize, from the output of each IR sensor 533, the location and/or relative motion of the object 150, for example.

It will be appreciated that a scanning pattern whereby multiple regions are scanned in parallel, such as that described above in connection with FIG. 13, may advantageously be used in combination with the implementation illustrated in FIG. 13. Such a combination may increase the scanning speed, or increase the achievable resolution for a given scanning speed, for example.

Figure 14:
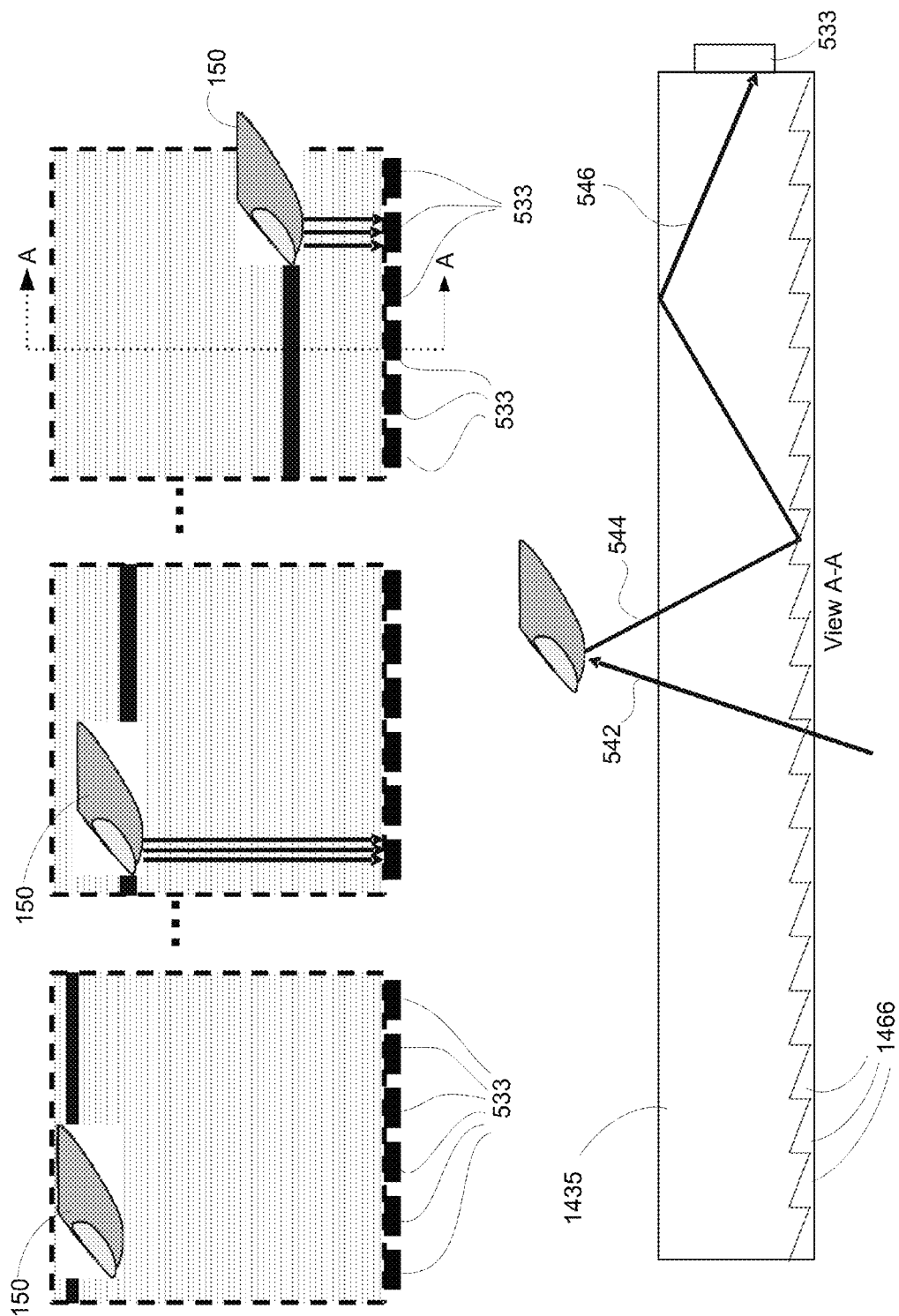
FIG. 14 shows an example of a light turning arrangement and light sensors, according to a yet further implementation.

FIG. 14 shows an example of a light turning arrangement and light sensors, according to a yet further implementation. The illustrated implementation includes a number of IR light sensors 533 disposed along a first side of a transparent substrate 1435. The transparent substrate 1435 includes a light turning arrangement that includes light turning elements 1466 that, at least in aggregate, turn the scattered light 544 toward the first side of the transparent substrate 1435. The light turning elements 1466 may be configured with directional turning features, such as linear grooves or ridges, holographic, or diffractive features, for example.

Advantageously, the scattered light 544 received by the transparent substrate 1435, interacting with such light turning elements, may be turned directionally toward the respective IR light sensor 533. The redirected scattered light 546 may be turned in a direction having a substantial component parallel to the upper surface x-z plane, and undergo TIR. As a result of directionally turning the scattered light 544, at least a large fraction of the redirected scattered light 546 may reach one or more of the IR light sensors 533.

Light modulators may be selectively switched to the open position in a temporal sequence according to a scanning pattern in synchronization with flashes of one or more IR light emitters of the display lighting system. When the object 150 is approximately above a light modulator, or block of light modulators, switched to the open position, the object 150 may interact with the emitted IR light 542. The scattered light 544 resulting from interaction of the emitted IR light 542 with the object 150 may interact with the light-turning arrangement, as described above, and the large fraction of redirected scattered light 546 may reach one or more of the IR light sensors 533. Each IR light sensor 533 may be configured to output, to a processor (not shown), a signal representative of a characteristic of the received, redirected scattered light 546. The processor may be configured to recognize, from the output of each IR sensor 533, the location and/or relative motion of the object 150, for example.

The redirected scattered light 546 may reach two or more IR light sensors 533 and each IR light sensor 533 may be configured to output, to a processor (not shown), respective signals representative of a characteristic of the respectively received redirected scattered light 546. In some implementations the processor may be configured to weigh the signals received from the two or more IR light sensors 533 in order to more precisely recognize, from the output of each IR sensor 533, the location and/or relative motion of the object 150, for example.

Figure 15:
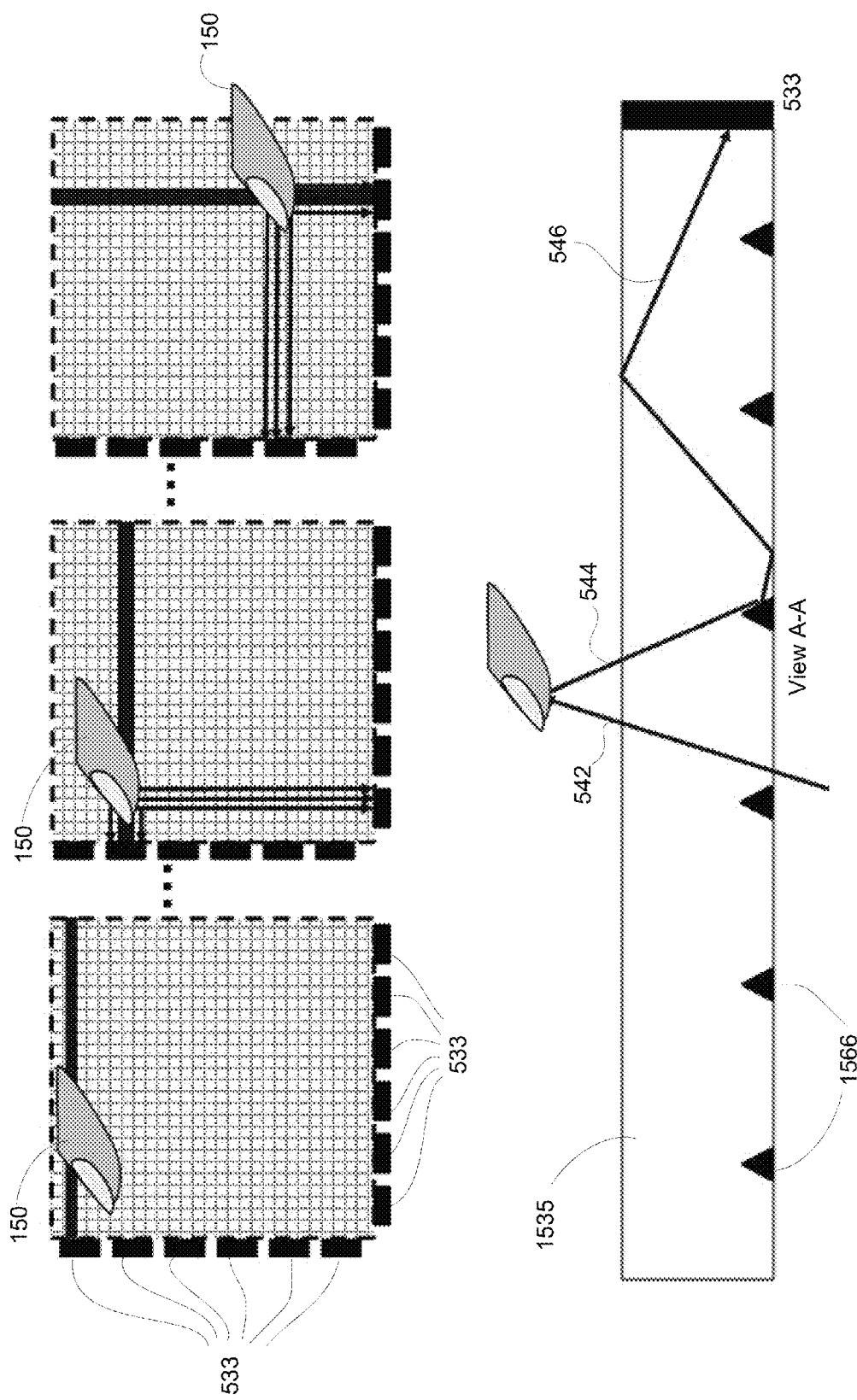
FIG. 15 shows an example of a light turning arrangement and light sensors, according to another implementation.

FIG. 15 shows an example of a light turning arrangement and light sensors, according to another implementation. The illustrated implementation includes a number of IR light sensors 533 disposed along each of two adjacent sides of transparent substrate 1535. The transparent substrate 1535 includes a light turning arrangement that includes light turning elements 1566 that, at least in aggregate, turn the scattered light 544 towards a first side of the transparent substrate 1535 and a second, adjacent side of the transparent substrate 1535. The light turning elements 1566 may include microstructures such as reflective or refractive pyramids or cones, or be configured with holographic or diffractive features, for example. Advantageously, the scattered light 544 received by the transparent substrate 1535, interacting with such light turning elements, may be turned directionally toward the IR light sensors 533 disposed on the first side and/or the second side. The redirected scattered light 546 may be turned in a direction having a substantial component parallel to the upper surface x-z plane, and undergo TIR. As a result of directionally turning the scattered light 544, at least a large fraction of the redirected scattered light 546 may reach one or more of the IR light sensors 533.

Light modulators may be selectively switched to the open position in a temporal sequence according to a scanning pattern in synchronization with flashes of one or more IR light emitters of the display lighting system. When the object 150 is approximately above a light modulator, or block of light modulators, switched to the open position, the object 150 may interact with the emitted IR light 542. The scattered light 544 resulting from interaction of the emitted IR light 542 with the object 150 may interact with the light-turning arrangement, as described above, and the large fraction of the redirected scattered light 546 may reach one or more of the IR light sensors 533. Each IR light sensor 533 may be configured to output, to a processor (not shown), a signal representative of a characteristic of the redirected scattered light 546. The processor may be configured to recognize, from the output of each IR sensor 533, the location and/or relative motion of the object 150, for example.

The redirected scattered light 546 may reach two or more IR light sensors 533 and each IR light sensor 533 may be configured to output, to a processor (not shown), respective signals representative of a characteristic of the respectively received redirected light 546. In some implementations the processor may be configured to weigh the signals received from the two or more IR light sensors 533 in order to more precisely recognize, from the output of each IR sensor 533, the location and/or relative motion of the object 150, for example.

Figure 16:
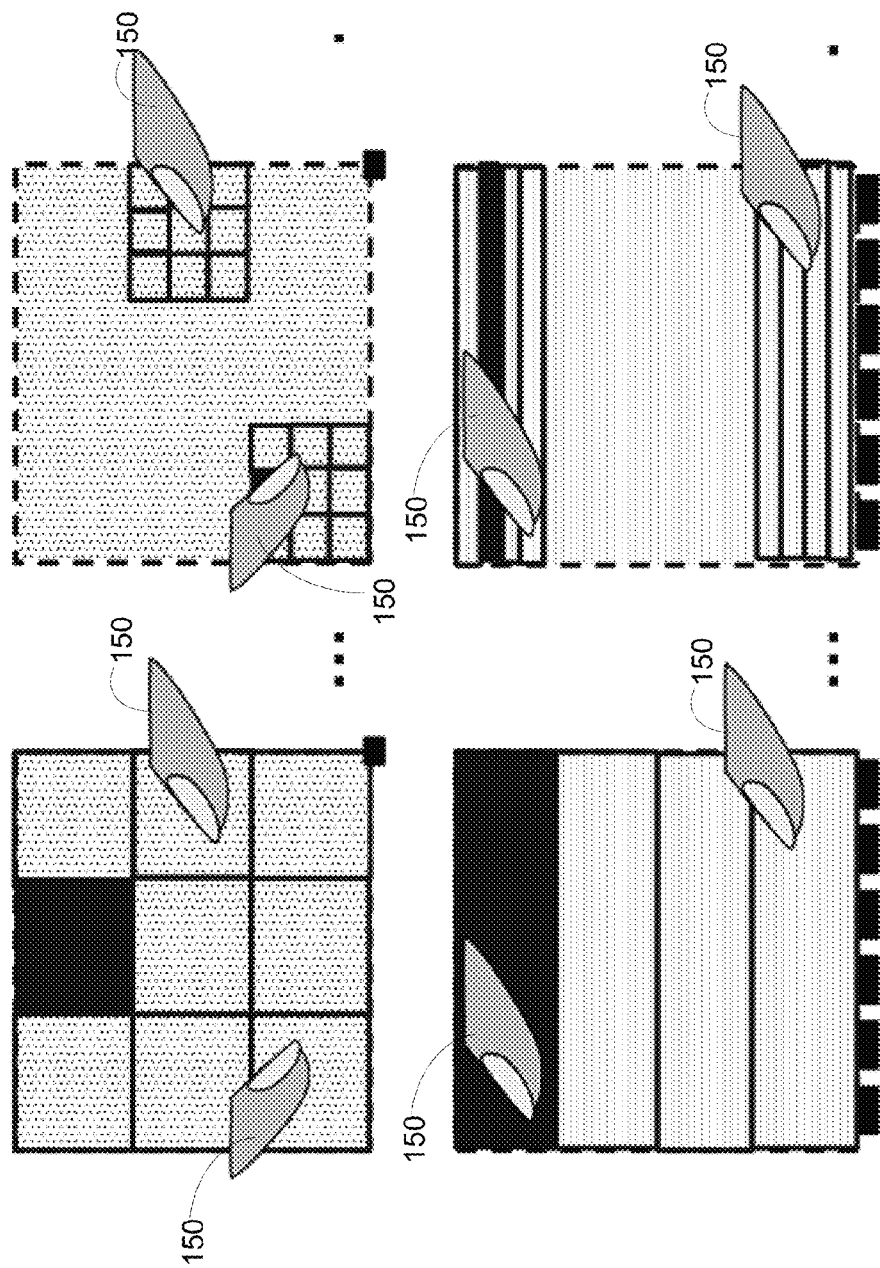
FIG. 16 shows an example of a scanning pattern in which a size of aperture blocks may be adjusted.

Irrespective of the configuration of light turning arrangement and light sensor(s), the second modulation scheme may include a scanning pattern that includes blocks of apertures of a selectably adjustable size. FIG. 16 shows an example of a scanning pattern in which a size of aperture blocks may be adjusted. In such implementations, the scanning pattern may be initiated with relatively large blocks until a relatively course location of the object 150 is recognized. Subsequently, the aperture block size may be reduced, and scanning continued in a smaller region proximate to the relatively course location. If desired this sequence may be repeated one or more times. Advantageously, the above mentioned implementations may reduce the number of necessary sub-frames, increase the scanning speed, or increase the achievable resolution with the same number of sub-frames.

Figure 17:
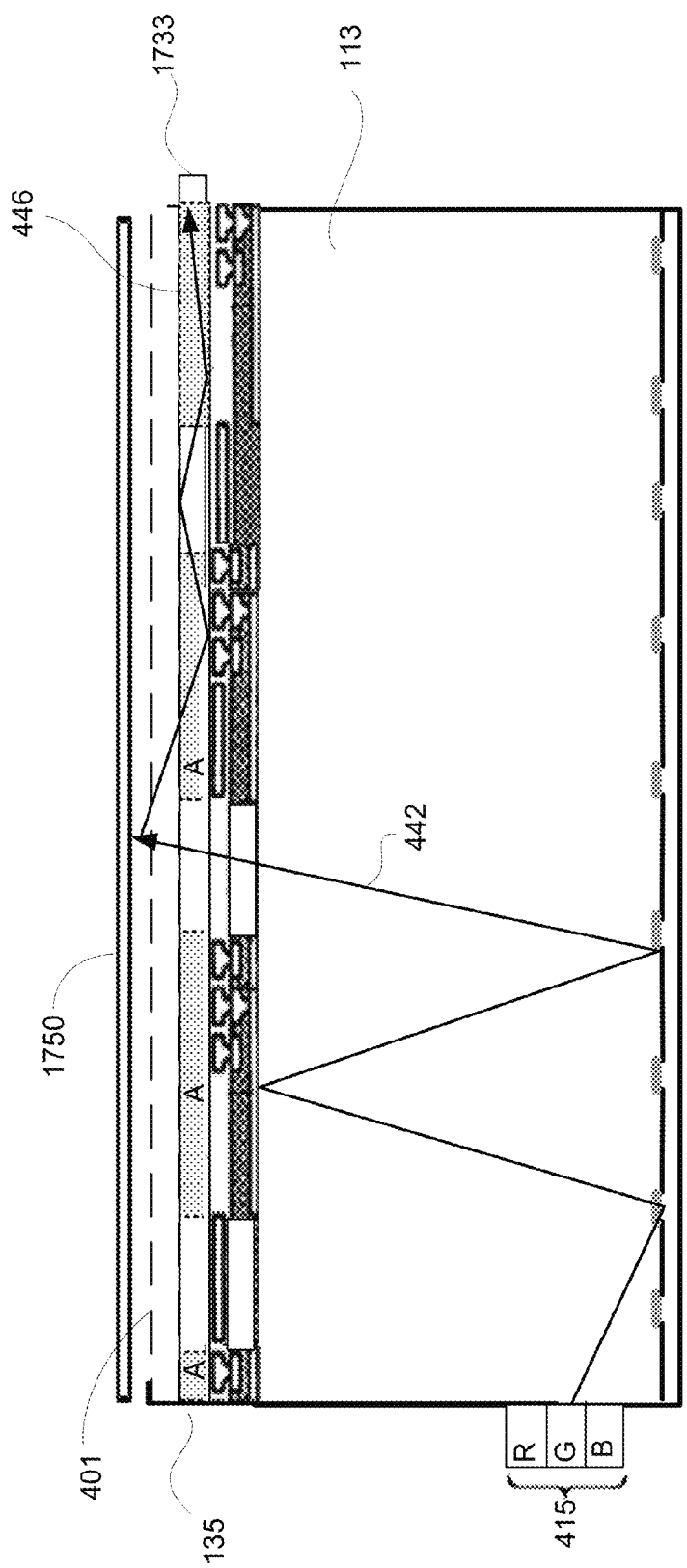
FIG. 17 illustrates an example of an interactive display, configured for document scanning, according to an implementation.

In some implementations, documents or objects proximate to the display may be scanned using visible light. FIG. 17 illustrates an example of an interactive display, configured for document scanning, according to an implementation. In the illustrated implementation, it is shown how a color scan may be performed on an object or document 1750 that is proximate to the front surface 401. The object or document 1750 may be scanned by sequentially flashing RGB light emitters of the display lighting system 415, and taking a separate light sensor reading for each illumination sub-frame using a visible (white) light sensor 1733.

For example, referring still to FIG. 17, the green light emitter of the display lighting system 415 may be configured to emit the object illuminating light 442 into the optical cavity 113. At least a portion of the object illuminating light 442 may undergo TIR and be distributed substantially uniformly throughout the optical cavity 113.

At least a portion of the object illuminating light 442 may be transmitted through a light modulator switched to the open position, and interact with the object or document 1750. Scattered light resulting from the interaction may be received by the transparent substrate 135 via the front surface 401. More particularly, the received light may be redirected to an angle larger than the critical angle of the glass or other transparent material of which the transparent substrate 135 may be composed. The redirected scattered light 446 may be guided by total-internal-reflection (TIR) within the transparent substrate 135 to the edges of the transparent substrate 135 and be received by the light sensor 1733.

For clarity of illustration, FIG. 17 shows only a single color of light being emitted through a single aperture. Consistent with the techniques disclosed hereinabove however, a temporal sequence of light emissions may be sequentially flashed by each of, for example, the RGB light emitters of the display lighting system 415. Moreover, the presently disclosed document scanning technique may be performed in conjunction with performing the second modulation scheme that includes selectively opening of light modulators according to one or more scanning patterns.

Figure 18:
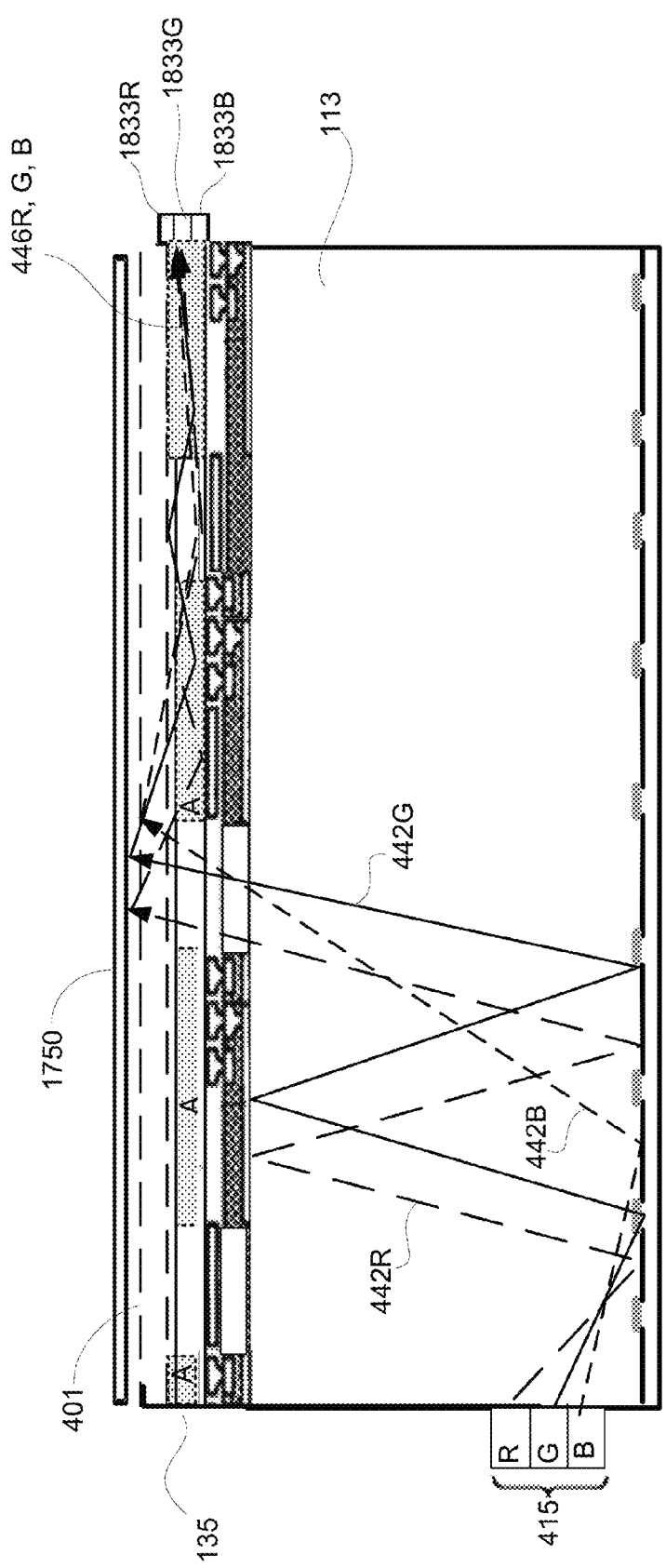
FIG. 18 illustrates an example of an interactive display, configured for document scanning, according to a further implementation.

In some implementations, the RGB light emitters of the display light system 415 may be simultaneously illuminated. FIG. 18 illustrates an example of an interactive display, configured for document scanning, according to a further implementation. In the illustrated implementation, it is shown how a color scan may be performed on the object or document 1750 that is proximate to the front surface 401. The object or document 1750 may be scanned by simultaneously flashed RGB light emitters of the display lighting system 415. In the illustrated implementation light sensor 1833 includes multiple photosensitive elements, each sensitized, by way of respective filters, for example, to an individual color. Each individual photosensitive element, for example, 1833R, 1833G and 1833B may output a separate signal reading for each illumination sub-frame.

At least a portion of the object illuminating light 442R, 442G, and 442B may be transmitted through a light modulator switched to the open position, and interact with the object or document 1750. Scattered light resulting from the interaction may be received by the transparent substrate 135 via the front surface 401. More particularly, the received light may be redirected to an angle larger than the critical angle of the glass or other transparent material of which the transparent substrate 135 may be composed. The redirected scattered light 446R, 446G, and 446B may be guided by total-internal-reflection (TIR) within the transparent substrate 135 to the edges of the transparent substrate 135 and be received by the light sensor 1833, including the individual light sensing elements 1833R, 1833G, and 1833B.

For clarity of illustration, FIG. 18 shows light being emitted only through a single aperture. Consistent with the techniques disclosed hereinabove however, the presently disclosed document scanning technique may be performed in conjunction with performing the second modulation scheme that includes selectively opening of light modulators according to one or more scanning patterns.

Figure 19:
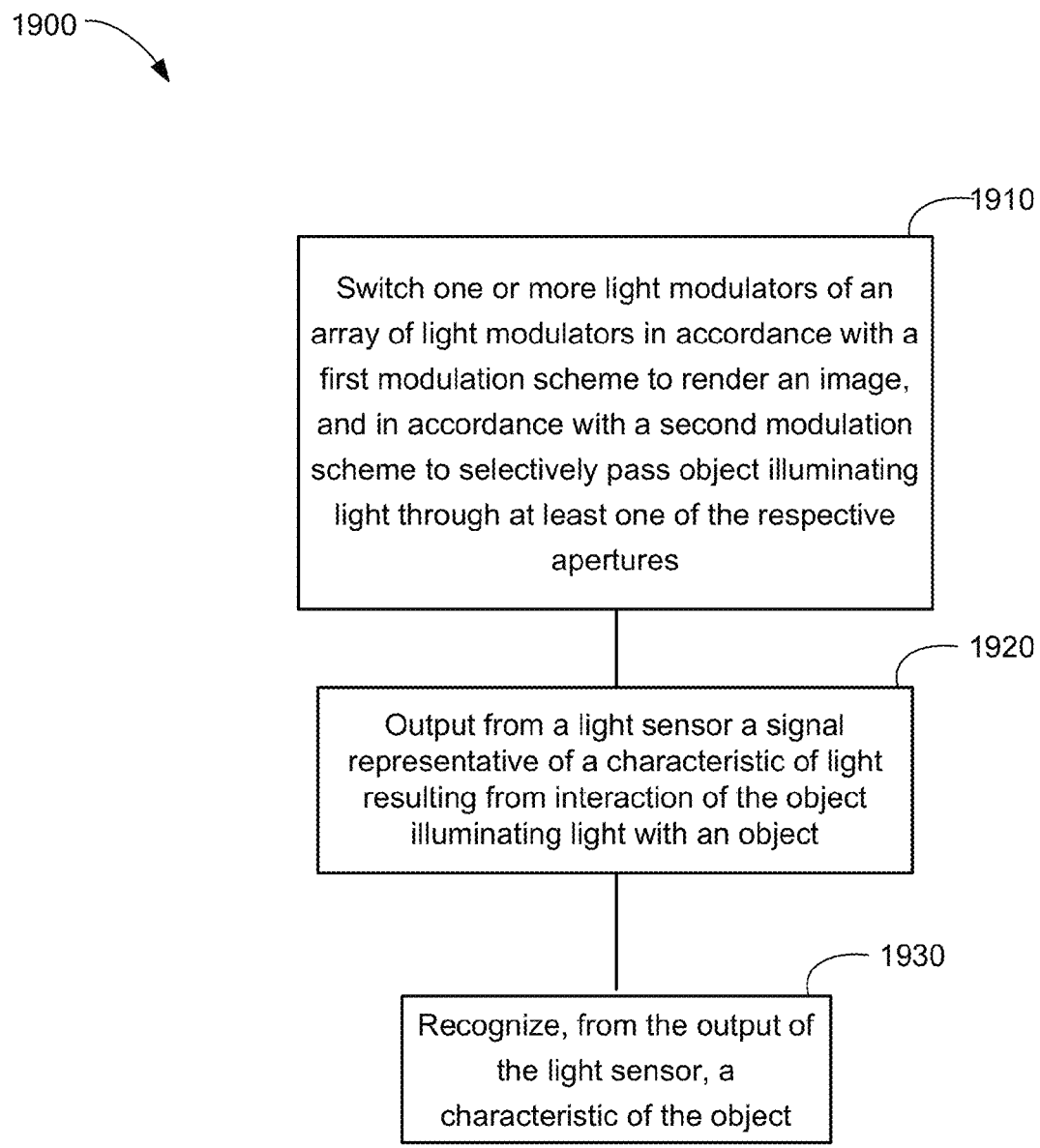
FIG. 19 illustrates an example of a process flow for recognizing a characteristic of an object with an FSC display according to an embodiment.

FIG. 19 illustrates an example of a process flow for recognizing a characteristic of an object with an FSC display according to an embodiment. At block 1910 of process 1900, one or more light modulators of an array of light modulators may be switched in accordance with a first modulation scheme to render an image, and in accordance with a second modulation scheme to selectively pass object illuminating light through at least one of the respective apertures. Advantageously, the object illuminating light may be at least partially unrelated to the image. In some implementations, the light modulators may be switched by a processor configured to control the interactive display. As described hereinabove, the interactive display may have a front surface including a viewing area. The interactive display may include a display lighting system and an arrangement for spatial light modulation, the arrangement for spatial light modulation including the array of light modulators. Each light modulator may be configured to be switched between an open position that permits transmittance of light from the display lighting system through a respective aperture to the front surface and a shut position that blocks light transmission through the respective aperture. A transparent substrate may be disposed between the display lighting system and the front surface and substantially parallel to the front surface, and having a periphery at least coextensive with the viewing area. At least one light sensor may be disposed outside the periphery of the transparent substrate. The light modulators may be micro electromechanical (MEM) devices disposed proximate to a rear surface of the transparent substrate. The transparent substrate may be configured to pass light emitted by the display lighting system toward the front surface and to receive light reflected through the front surface from an object, the transparent substrate including a first light-turning arrangement that redirects a portion of the received light toward the light sensor.

At block 1920, the light sensor may output to the processor a signal representative of the characteristic of the received, redirected light.

At block 1930, the processor may recognize, from the output of the light sensor, a characteristic of the object. The characteristic may include one or more of a location, or a motion of the object, or image data. Advantageously, the processor may control the display, responsive to the characteristic.

Thus, improved implementations relating to an interactive FSC display have been disclosed. In some of the above described implementations, the display lighting system may include light sources configured to be fully or partially modulated at some frequency or signal pattern. In such implementations, the processor may include and/or be coupled with light sensor readout circuitry that includes an active or passive electrical band-pass frequency filter or other means to correlate the modulator signal pattern. In addition to modulation, the intensity of the light sources may be scaled to the (possibly lower or higher) appropriate amount of light for scanning rather than displaying information.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an apparatus as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
an interactive field sequential color (FSC) display having a front surface including a viewing area, the FSC display including a display lighting system and an arrangement for spatial light modulation, the arrangement for spatial light modulation including an array of light modulators and apertures, each light modulator configured to be switched between an open position that permits transmittance of light from the display lighting system through a respective one of the apertures to the front surface and a shut position that blocks light transmission through the respective aperture;
a transparent substrate, disposed between the display lighting system and the front surface and substantially parallel to the front surface, and having a periphery at least coextensive with the viewing area, the transparent substrate including a plurality of light turning elements selectively located in areas not directly above the apertures;
at least one light sensor disposed outside the periphery of the transparent substrate; and
a processor; wherein:
 the light modulators are switched in accordance with a first modulation scheme to render an image, the first modulation scheme adapted to utilize a persistence of vision phenomenon to render color images by sequentially alternating the color of visible light emitted by the display lighting system;
 the transparent substrate is configured to pass light emitted by the display lighting system toward the front surface and to receive light reflected through the front surface from an object, the transparent substrate including a first light-turning arrangement that redirects a portion of the received light toward the at least one light sensor;
 the light sensor is configured to output, to the processor, a signal representative of a characteristic of the received, redirected light; and
 the processor is configured to:
  switch the light modulators in accordance with a second modulation scheme to selectively pass object illuminating light from the display lighting system through at least one of the respective apertures, the object illuminating light being at least partially unrelated to the image; and
  recognize, from the output of the light sensor, a characteristic of the object.

2. The apparatus of claim 1, wherein:
the display lighting system includes at least one infrared (IR) light emitter;
the at least one light sensor includes an IR light sensor;
the transparent substrate is configured to pass IR light emitted by the display lighting system toward the front surface and to receive IR light scattered through the display front surface from the object; and
the first light-turning arrangement redirects a portion of the received IR light toward the IR light sensor.

3. The apparatus of claim 2, wherein the transparent substrate includes a partial layer of a coating material, the coating material being opaque to visible light and substantially transparent to IR light.

4. The apparatus of claim 3, wherein the partial layer is selectively located in regions of the transparent substrate that are spatially removed from the corresponding apertures.

5. The apparatus of claim 1, wherein the second modulation scheme includes a sensing pattern interspersed between visible image patterns.

6. The apparatus of claim 5, wherein the sensing pattern includes a raster scan.

7. The apparatus of claim 1, wherein the array of light modulators includes a layer disposed on the rear surface of the transparent substrate.

8. The apparatus of claim 1, wherein the first light-turning arrangement is proximate to a front surface of the transparent substrate.

9. The apparatus of claim 1 wherein the processor is configured to recognize, from an output of the IR light sensor, a location of the object.

10. The apparatus of claim 9 wherein the display lighting system emits visible light during a first number of sub-frames and emits IR light during a second number of sub-frames.

11. The apparatus of claim 10 wherein a ratio of the first number to the second number is 10:1.

12. The apparatus of claim 10 wherein the IR light emitter is flashed during a sub-frame where image data is being displayed.

13. The apparatus of claim 1, wherein the processor controls the display, responsive to the characteristic.

14. The apparatus of claim 1, wherein the characteristic is one or more of a location, or a motion of the object.

15. The apparatus of claim 1, wherein the first light-turning arrangement includes one or more of diffractive, refractive or holographic elements.

16. The apparatus of claim 1, wherein the object includes one or more of a hand, finger, hand held object, and other object under control of a user.

17. An apparatus comprising:
an interactive field sequential color (FSC) display having a front surface including a viewing area, the FSC display including a display lighting system and an arrangement for spatial light modulation, the arrangement for spatial light modulation including an array of light modulators and apertures, each light modulator configured to be switched between an open position that permits transmittance of light from the display lighting system through a respective one of the apertures to the front surface and a shut position that blocks light transmission through the respective aperture;
a transparent substrate, disposed between the display lighting system and the front surface and substantially parallel to the front surface, and having a periphery at least coextensive with the viewing area, the transparent substrate including a plurality of light turning elements selectively located in areas not directly above the apertures;
at least one light sensor disposed outside the periphery of the transparent substrate; and
means for recognizing, from the output of the light sensor, a characteristic of the object; and
means for switching the light modulators wherein:
the light modulators are switched in accordance with a first modulation scheme to render an image, and in accordance with a second modulation scheme to selectively pass object illuminating light from the display lighting system through at least one of the respective apertures, the object illuminating light being at least partially unrelated to the image, the first modulation scheme adapted to utilize a persistence of vision phenomenon to render color images by sequentially alternating the color of visible light emitted by the display lighting system;
the transparent substrate is configured to pass light emitted by the display lighting system toward the front surface and to receive light reflected through the front surface from an object, the transparent substrate including a first light-turning arrangement that redirects a portion of the received light toward the at least one light sensor;
the light sensor is configured to output, to the processor, a signal representative of a characteristic of the received, redirected light.

18. The apparatus of claim 17, wherein the second modulation scheme includes a sensing pattern interspersed between visible image patterns.

19. A method comprising:
switching, with a processor, one or more light modulators of an array of light modulators, wherein:
a field sequential color (FSC) display has a front surface including a viewing area, the FSC display including a display lighting system and an arrangement for spatial light modulation, the arrangement for spatial light modulation including an array of light modulators and apertures, each light modulator configured to be switched between an open position that permits transmittance of light from the display lighting system through a respective one of the apertures to the front surface and a shut position that blocks light transmission through the respective aperture, the transparent substrate including a plurality of light turning elements selectively located in areas not directly above the apertures;
a transparent substrate is disposed between the display lighting system and the front surface and substantially parallel to the front surface, and having a periphery at least coextensive with the viewing area;
at least one light sensor is disposed outside the periphery of the transparent substrate;
the light modulators are switched in accordance with a first modulation scheme to render an image, and in accordance with a second modulation scheme to selectively pass object illuminating light from the display lighting system through at least one of the respective apertures, the object illuminating light being at least partially unrelated to the image, the first modulation scheme adapted to utilize a persistence of vision phenomenon to render color images by sequentially alternating the color of visible light emitted by the display lighting system; and
the transparent substrate is configured to pass light emitted by the display lighting system toward the front surface and to receive light reflected through the front surface from an object, the transparent substrate including a first light-turning arrangement that redirects a portion of the received light toward the at least one light sensor;
outputting, from the light sensor to the processor, a signal representative of a characteristic of the received, redirected light; and
recognizing, from the output of the light sensor, a characteristic of the object.

20. The apparatus of claim 19, wherein the characteristic is one or more of a location, or a motion of the object.

* * * * *